(12) United States Patent
Lee

(10) Patent No.: US 9,814,277 B2
(45) Date of Patent: Nov. 14, 2017

(54) BIB ASSEMBLY

(71) Applicant: Gordon J. Lee, Moorhead, MN (US)

(72) Inventor: Gordon J. Lee, Moorhead, MN (US)

( * ) Notice: Subject to any disclaimer, the term of this patent is extended or adjusted under 35 U.S.C. 154(b) by 0 days.

(21) Appl. No.: 14/605,725

(22) Filed: Jan. 26, 2015

(65) Prior Publication Data

US 2015/0366279 A1    Dec. 24, 2015

Related U.S. Application Data

(63) Continuation of application No. 13/209,625, filed on Aug. 15, 2011, now Pat. No. 8,966,665, which is a continuation-in-part of application No. 12/834,988, filed on Jul. 13, 2010, now abandoned.

(60) Provisional application No. 61/226,329, filed on Jul. 17, 2009, provisional application No. 61/374,925, filed on Aug. 18, 2010, provisional application No. 61/503,977, filed on Jul. 1, 2011.

(51) Int. Cl.
| | | |
|---|---|---|
| A41D 27/12 | (2006.01) |
| A44B 17/00 | (2006.01) |
| A44B 6/00 | (2006.01) |
| A41D 13/04 | (2006.01) |
| A47G 21/16 | (2006.01) |
| F16B 2/24 | (2006.01) |
| A45F 5/04 | (2006.01) |
| B60R 11/00 | (2006.01) |

(52) U.S. Cl.
CPC ............. *A41D 27/12* (2013.01); *A41D 13/04* (2013.01); *A44B 6/00* (2013.01); *A44B 17/0005* (2013.01); *A47G 21/165* (2013.01); *F16B 2/245* (2013.01); *A45F 5/04* (2013.01); *B60R 2011/0031* (2013.01); *B60R 2011/0059* (2013.01); *B60R 2011/0063* (2013.01); *B60R 2011/0071* (2013.01)

(58) Field of Classification Search
CPC ... A41B 13/10; A41B 13/103; A41B 2400/52; A41D 13/04; A41D 27/12
See application file for complete search history.

(56) References Cited

U.S. PATENT DOCUMENTS

| | | |
|---|---|---|
| 89,018 A | 4/1869 | Brooks |
| 357,370 A | 2/1887 | Cohn |
| 563,644 A | 7/1896 | Birney |
| 677,010 A | 6/1901 | Ziller |

(Continued)

FOREIGN PATENT DOCUMENTS

| | | |
|---|---|---|
| CA | 2536832 | 3/2005 |
| CA | 2445551 | 4/2005 |

*Primary Examiner* — David R Dunn
*Assistant Examiner* — Tania Abraham
(74) *Attorney, Agent, or Firm* — Marsh Fischmann & Breyfogle LLP

(57) ABSTRACT

A bib and corresponding mounting clip are disclosed. A bib body may include one or more of an upper reinforcement member, a plurality of body reinforcement members, and a plurality of pocket reinforcement members. The upper reinforcement facilitates having the bib body be suspended from the mounting clip at a single location or region. The plurality of body reinforcement members allows the bib body to be shaped to "funnel" food particles and the like, for instance into a pocket incorporated by the bib body. The plurality of pocket reinforcement members may be used to retain such a pocket in an open configuration.

22 Claims, 20 Drawing Sheets

(56) References Cited

U.S. PATENT DOCUMENTS

| | | | |
|---|---|---|---|
| 686,631 A | 11/1901 | McCathie | |
| 724,011 A | 3/1903 | Hudson | |
| 823,746 A | 6/1906 | Vaughn | |
| 831,931 A | 9/1906 | Cling | |
| 879,124 A | 2/1908 | Thompson | |
| 1,019,339 A | 3/1912 | McDermott | |
| 2,288,703 A | 7/1942 | Herbener | |
| 2,423,581 A * | 7/1947 | Clark | A41B 13/10 2/144 |
| 2,538,469 A | 1/1951 | O'Brien | |
| 2,569,915 A | 10/1951 | Arseneault | |
| 2,620,475 A | 12/1952 | Legg et al. | |
| 2,727,240 A | 12/1955 | Marshall | |
| 2,778,024 A | 1/1957 | Randolph | |
| 2,789,289 A | 4/1957 | Stevens et al. | |
| 2,852,781 A | 9/1958 | Ganser | |
| 2,884,638 A | 5/1959 | Ream | |
| 2,908,913 A | 10/1959 | Sobel | |
| 3,010,111 A | 11/1961 | Ralph | |
| 3,398,438 A * | 8/1968 | Fried | A41B 13/10 24/7 |
| 3,407,407 A | 10/1968 | Hollander | |
| 3,540,060 A | 11/1970 | Brown | |
| 4,441,212 A * | 4/1984 | Ahr | A41B 13/103 2/49.2 |
| 4,445,231 A | 5/1984 | Noel | |
| 4,649,572 A | 3/1987 | Roessler | |
| 4,660,226 A | 4/1987 | Quilling et al. | |
| 4,862,518 A | 9/1989 | Williams et al. | |
| 4,924,527 A | 5/1990 | Hintermeyer | |
| 5,457,820 A | 10/1995 | Yielding | |
| 5,469,580 A | 11/1995 | Sobol | |
| 5,483,701 A | 1/1996 | Ferreyros | |
| 5,490,289 A | 2/1996 | Lehrer | |
| 5,530,968 A | 7/1996 | Crockett | |
| 5,893,171 A * | 4/1999 | Ries | A41D 1/205 2/104 |
| 5,933,922 A | 8/1999 | Ochsman | |
| 5,956,763 A | 9/1999 | Blackshear | |
| 5,960,472 A | 10/1999 | Reid | |
| 6,021,521 A | 2/2000 | Baratta | |
| 6,021,550 A * | 2/2000 | Welch | A45F 5/04 24/304 |
| 6,105,165 A | 8/2000 | Johnson et al. | |
| 6,128,780 A | 10/2000 | Reinhart et al. | |
| 6,189,166 B1 * | 2/2001 | Braine | A41B 13/06 2/69 |
| 6,209,133 B1 | 4/2001 | Hinshaw | |
| 6,308,333 B1 | 10/2001 | Jackson | |
| 6,374,411 B1 | 4/2002 | Duhn | |
| 6,381,751 B1 | 5/2002 | Benjamin et al. | |
| 6,490,731 B1 | 12/2002 | Hyatt | |
| 6,499,140 B1 | 12/2002 | Benjamin et al. | |
| 6,732,375 B2 | 5/2004 | Nornes | |
| 6,742,189 B2 | 6/2004 | Bennett | |
| 6,769,135 B1 | 8/2004 | Monroe | |
| 6,783,185 B1 * | 8/2004 | Sutton | A41B 13/10 2/49.2 |
| 6,789,265 B1 * | 9/2004 | Vonrinteln | A41B 13/103 2/48 |
| 6,826,780 B1 * | 12/2004 | Romesburg | A41B 13/103 2/48 |
| 6,836,900 B1 | 1/2005 | Fus, Sr. | |
| 6,859,938 B1 | 3/2005 | Niski et al. | |
| 6,925,687 B1 * | 8/2005 | Overton | A45F 5/02 24/543 |
| D530,887 S | 10/2006 | Harless | |
| 7,143,448 B1 | 12/2006 | Gottehrer | |
| 7,174,571 B1 | 2/2007 | Vonrinteln | |
| 7,260,851 B1 | 8/2007 | Milnark et al. | |
| 7,269,855 B2 | 9/2007 | LaRocco | |
| 7,269,857 B2 | 9/2007 | Cymbol | |
| 7,380,284 B1 * | 6/2008 | Dodani | A41B 13/10 2/49.1 |
| 7,383,589 B2 | 6/2008 | Friedland et al. | |
| 7,406,718 B2 | 8/2008 | Ekelund et al. | |
| 7,409,727 B2 | 8/2008 | Ekelund et al. | |
| 7,451,494 B2 | 11/2008 | Monroe et al. | |
| D625,903 S | 10/2010 | Conley | |
| 8,151,372 B2 | 4/2012 | Densmore et al. | |
| 8,166,571 B2 | 5/2012 | Fletcher | |
| 8,966,665 B2 | 3/2015 | Lee | |
| 2001/0054191 A1 | 12/2001 | Frye | |
| 2004/0205876 A1 | 10/2004 | Bruffett | |
| 2007/0157357 A1 | 7/2007 | Cymbol | |
| 2007/0250979 A1 | 11/2007 | Han | |
| 2007/0277293 A1 | 12/2007 | Koepp | |
| 2008/0052801 A1 | 3/2008 | Monroe | |
| 2008/0148462 A1 | 6/2008 | Monroe et al. | |
| 2008/0244803 A1 | 10/2008 | Ekelund et al. | |
| 2008/0289075 A1 | 11/2008 | Ward, Jr. | |
| 2008/0301847 A1 | 12/2008 | Holland | |
| 2009/0007308 A1 | 1/2009 | McKay | |
| 2011/0016600 A1 | 1/2011 | Ekelund et al. | |
| 2011/0296578 A1 | 12/2011 | Lee | |
| 2012/0042431 A1 | 2/2012 | Lee | |
| 2012/0117707 A1 | 5/2012 | Gay | |
| 2013/0086725 A1 | 4/2013 | Sabre | |
| 2013/0111644 A1 | 5/2013 | Timmons et al. | |

* cited by examiner

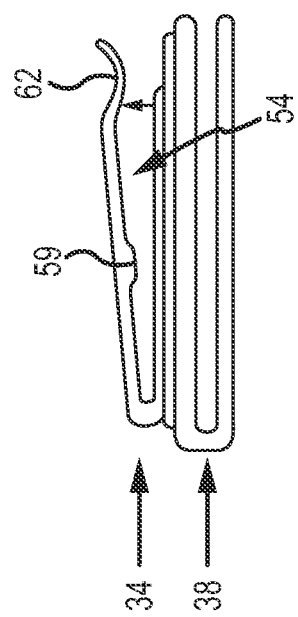
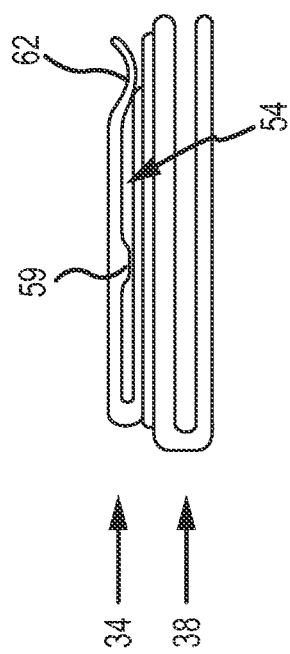

BIB ASSEMBLY

CROSS-REFERENCE TO RELATED APPLICATIONS

This patent application is a continuation of U.S. patent application Ser. No. 13/209,625, that is entitled "BIB ASSEMBLY," and that was filed on Aug. 15, 2011: 1) which is continuation-in-part of U.S. patent application Ser. No. 12/834,988, that is entitled "SPILLGUARD," and that was filed on Jul. 13, 2010, which is a non-provisional patent application of U.S. Patent Application Ser. No. 61/226,329, that is entitled "SPILLGUARD," and that was filed on Jul. 17, 2009; and 2) which is also a non-provisional application of each of the following provisional patent applications: i) U.S. Patent Application Ser. No. 61/374,925, that is entitled "TRAVEL BIB," and that was filed on Aug. 18, 2010; and ii) U.S. Patent Application Ser. No. 61/503,977, that is entitled "TRAVEL BIB," and that was filed on Jul. 1, 2011. Priority is claimed to each of the above-noted patent applications, and the entire disclosure of each of the above-noted patent applications is also incorporated by reference in their entirety herein.

FIELD OF THE INVENTION

The present invention generally relates to the field of clothing protection devices and, more particularly, to providing for the attachment of clothing protection devices to an appropriate article such as clothing.

BACKGROUND

Bibs are often used by people of different ages at home, restaurants, nursing homes, and the like to prevent or reduce the likelihood of clothes becoming soiled. Bibs are made in a variety of sizes to cover a user anywhere between the user's neck to the user's lap. Some bibs are reusable and as such may be made from cloth or plastic, while others are disposable and may be made from inexpensive materials such as a plastic-coated paper or thin plastic. Typically, the bib is secured behind the user's neck using devices such as ties, snaps, and the like.

It has become increasingly popular for drivers and passengers in vehicles to eat and drink while in transit, which often results in spills due to vehicle movements (e.g., accelerations and decelerations; encountering bumps in the road; swerving of the vehicle). Drivers sometimes attempt to use bibs to prevent their clothing from being soiled by food and beverage spills.

SUMMARY

A first aspect of the present invention is embodied by a bib system including a clip or mounting clip, the clip having strap and bib sections (e.g., first and second clip sections or clasps) that are rotatably interconnected to each other. The clip is adapted to be mounted on a strap (e.g., a strap of a restraint system of any appropriate type, such as one commonly used, in a vehicle such as a motor vehicle (e.g., a passenger seat in a car), a train, or an airplane, or the like; in an infant car seat), that in turn is engageable with a seat occupant.

A number of feature refinements and additional features are applicable to the first aspect of the present invention. These feature refinements and additional features may be used individually or in any combination. The following discussion is applicable to the first aspect, up to the start of the discussion of a second aspect of the present invention. Initially, the bib section of the mounting clip may be characterized as being a first portion of the mounting clip that is attachable to a corresponding bib. The strap section may be characterized as being a second portion of the mounting clip that is attachable to an article (e.g., a strap of a restraint system) from which a corresponding bib is to be suspended.

The strap and bib sections may detachably mount to a strap and a bib in any appropriate manner. That is, the strap and bib sections may be configured so that detaching the same from a strap or bib does not adversely affect the structure of the strap and bib sections, such that they may thereafter be mounted to a strap or bib (e.g., the strap section may be repeatedly mounted to and dismounted from a strap without "breaking" the strap section; the bib section may be repeatedly mounted to and dismounted from a bib without "breaking" the bib section).

Any appropriate mounting configuration may be used by each of the strap and bib sections. Generally, each of the strap and bib sections may be characterized as having a pair of clamping members that are movable away from each other to allow a strap or bib to be positioned therebetween, and that are biased in some fashion toward each other (e.g., by a spring force, by a magnetic attraction, by a clamping force exerted on the pair of clamping members by another structure) to provide a clamping force to retain a strap or bib between these clamping members. The pair of clamping members may be interconnected in any appropriate manner, such as by a living hinge or the like, and may in fact be part of a common structure. One or both of the strap and bib sections could be in the form of a money clip or an at least generally U-shaped, spring-biased clamping device, a clothes-pin like arrangement, or any other type of clamping arrangement. One or both of the strap and bib sections could also be in the form of a pair of clamping members that are movable relative to each other between open and closed positions (e.g., via a living hinge between the pair of clamping members), and that are magnetically retained in the closed position (e.g., one or both of the clamping members may include one or more magnets) to retain a strap or bib therebetween. Any appropriate combination of mounting configurations may be used for the strap and bib sections.

The strap section of the clip may be adapted to be mounted (e.g., removably or detachably) on a strap of a restraint system, and the bib section of the clip may be adapted to detachably engage a bib. In other arrangements, the bib system may be used vice versa, such that the strap section may be adapted to detachably engage a bib, while the bib section may be adapted to be mounted (e.g., removably or detachably) on a strap. Although the bib system may be preferably for use with a strap of a restraint system, it could be installed on other types of objects such as clothing.

Any type of clip including rotatably connected strap and bib sections may be used as part of the bib system. In one arrangement, the strap section may be adapted to be detachably mounted on the strap. For instance, the strap section may be designed such that a seat occupant (e.g., a driver of a vehicle, a passenger of a vehicle, an infant in a car seat or the like) may be able to repeatedly mount the strap section onto and remove the strap section from the strap. In this regard, the seat occupant may mount the strap section onto the strap each time the occupant is going to sit on the associated seat (e.g., each time the occupant enters a vehicle). In other arrangements, the seat occupant may mount the strap section onto the strap and leave such strap section mounted to the strap for future use (e.g., upon exiting the vehicle). The strap section may be slid relative to the strap, for instance to allow for adjustment of the position of the clip during use or to accommodate/facilitate storage of the strap (e.g., if the strap is retractable).

The strap section may be adapted or operable to exert a retention force towards or against the strap, and such a retention force may be generated by any appropriate device or combination of devices, such as one or more mechanical devices (e.g., springs, biasing members), magnetic devices (e.g., magnet/ferromagnet combinations) and/or any combination of such devices. The strap section may be in the form of any structure or design operable to releasably retain or mount a bib, strap, or the like thereto. In one embodiment, the strap section may include first and second strap sections (e.g., first and second clamp portions or clamping members) that are movable relative to each other; in some variations, the strap section may be in the form of a "money clip"). For instance, such strap sections may be moved between at least a "strap installation" position and a "strap-retaining" position. Such first and second strap sections may be moved apart or otherwise separated to accommodate installation of the clip on the strap. The strap section may be operable to exert a force towards the strap-retaining position, even when the strap is in the strap installation position (e.g., the first and second strap sections may be biased to a strap-retaining position). In other variations, the strap section may be appropriately manipulated such that the retention force may be selectively "turned on" and "turned off". For instance, the strap section may include first and second strap sections that are connected by a hinge of any appropriate type (e.g., a living hinge), along with a slidable member (e.g., a spring or clasp) that may be operable to slide over and/or compress the first and second strap sections to exert the retention force on the strap. Generally, the strap section may be characterized as a clamp or a clamping structure of any appropriate type.

To increase the gripping or retention ability of the strap section against the strap, the strap section may include one or more strap interface sections (e.g., first and second strap interface sections that are spaced from each other). Any such strap interface sections may be in the form of protrusions, teeth, bumps, or the like. In some embodiments, such strap interface sections each include an elongated concave portion of the strap section; in other embodiments, each strap interface section may include at least one row of teeth. The strap interface sections may be designed or adapted to exert a greater retention force on the strap than a portion of the strap section that extends between the strap interface sections, or that portion of the strap section that is located between the strap interface sections. Stated otherwise, the portion of the strap section portion extending between the first and second strap interface sections may or may not be adapted to make contact with a strap retained by the strap section.

In another arrangement, the bib section may be operable to removably or detachably mount or connect to a bib. As such, the strap and bib sections may be adapted to collectively operate to removably or detachably mount a bib to a strap associated with a seat (e.g., in a vehicle). The bib section may be operable to exert a retention force against a bib, and such a retention force may be selected from one or more mechanical devices, magnetic devices and/or combinations thereof. The bib section may be in the form of any structure or design operable to releasably retain or mount a bib, strap, or the like thereto. For instance, the bib section may include first and second bib sections (e.g., first and second clamp sections or clamping members) that are movable (e.g., pivotable) relative to each other. For instance, the bib section may include any type of spring device, and such a spring device may be operable (in combination with the first and second bib sections) to exert the retention force against the bib. In some arrangements, the first and second bib sections may be pivotally connected by a pivot pin that may extend through a portion of a spring (e.g. a spring hinge). In other arrangements, the first and second bib sections may be pivotally connected by way of ball and socket type arrangements. Regardless of the specific arrangement utilized to accommodate movement of the first and second bib sections relative to each other, moving such first and second bib sections apart may accommodate installation of a bib in the clip. Generally, the bib section may be characterized as a clamp or a clamping structure of any appropriate type.

In some instances, the first and second bib sections may be biased towards a "bib-retaining" position. As such, once a user separates the first and second bib sections or otherwise moves such sections apart and inserts a bib therebetween, the first and second bib sections may be designed to automatically close or compress into the bib-retaining position to detachably secure the bib within the bib section. The first and second bib sections may alternatively or additionally be associated with magnetic devices that may be operable to exert the retention force against the bib. As a further example, each of the bib sections may be associated with hook portions (e.g., the hook portion of a hook and loop arrangement) that may be operable to interact with each other and thus resist separation of the bib sections. Such hook sections may additionally increase the gripping ability of the bib section against a bib. In other embodiments, at least one of the first and second bib sections may be associated with hook portions of a hook and loop arrangement while the other of the first and second bib sections may be associated with loop portions of a hook and loop arrangement. The bib section may also include spaced apart bib-interface sections that may be operable to increase the gripping ability of the bib section against a bib.

A portion of the bib and/or strap section may include a facilitation member that may be operable to aid in the loading, unloading and/or adjustment of a bib into, from or within the bib section. For instance, the facilitation member may be in the form of a roller or cylindrical member associated with one of the first and second bib sections (and rotatable relative thereto) that may be operable to contact and exert a retention force against the other of the first and second bib sections. During loading of a bib into a bib section including such a roller, a user may not need to separate the first and second bib sections. Instead, the user may be able to simply insert the bib between the roller and one of the first and second bib sections, and then pull the bib into a receiving space situated between the first and second bib sections. Once the user stops pulling the bib, the roller may be operable to inhibit or at least reduce the potential for relative movement of the bib out of the receiving space owing to the retention force generated by the roller against one of the first and second bib sections. Fine adjustments and unloading of the bib may be made in a similar way. In other arrangements, the roller or facilitation member may be associated with a portion of one of the bib and strap sections and may be operable to urge a portion of a bib or strap against a portion of the other of the bib strap sections.

At least a portion of the bib section and/or strap section may include a handle and/or finger grip to aid in the separation of the first and second bib sections and/or first and second strap sections. For instance, the handle may facilitate separation of the first and second bib sections and/or first and second strap sections against a biasing force generated by a spring, magnetic arrangement, or the like, and including any combination thereof.

The bib and strap sections may be rotatably interconnected to each other by way of any appropriate pivot assembly. The pivot assembly may allow the bib and strap sections to at least rotate or move about a first axis extending through a portion of the bib and strap section. In some instances, the pivot assembly may allow the bib section to be freely rotated relative to the strap section to one of an infinite number of rotational positions between the bib and strap sections. In other instances, the clip may include at least one pivot pin interconnecting the strap and bib sections that allows at least one of the bib and strap sections to be rotated relative to the other of the bib and straps sections between a plurality of predetermined positions. For instance, the clip may further include a plurality of retention positions for the strap section relative to the bib section. In this case, each of the retention positions may provide a greater resistance to relative rotational motion between the strap and bib sections than a separate transition position extending between each adjacent pair of retention positions. In one embodiment, the pivot assembly may include at least one protrusion (e.g., ball-shaped protrusion) on one of the strap and bib sections that may be repeatedly movable into and out of one of series of apertures, the apertures being situated in the shape of a circle. In another variation, the strap section may be repeatedly mountable on and removable from the bib section. For instance, the strap and bib sections may be interconnected via a magnetic coupling. As an example, a portion of the strap section may include a first connection member which may be in the form of a magnetic member (e.g., a ferromagnet or a magnet), while a portion of the bib section may include a second connection member which may be in the form of another magnetic member (e.g., a ferromagnet or a magnet). The magnetic members may be engaged to removably secure the strap section to the bib section. In this regard, a user may choose to removably secure the strap section to an object (e.g., strap) and then removably secure the bib section to another object (e.g., bib), the two objects initially being located in different locations. Thereafter, the user may appropriately connect the bib and strap sections utilizing the above-discussed magnetic members. Other types of connection members may be used (e.g., mechanical devices). In any case, the bib and strap sections still remain rotatable relative to each other.

In another arrangement, the clip may include a third section in addition to the bib and strap sections that may also serve to releasably engage any appropriate object. The third section may be rotatably interconnected to the bib and strap sections by way of the same pivot assembly so as to rotate about the first axis. In other embodiments, the third section may be interconnected to the clip by another pivot assembly that allows the third section to rotate about the first axis or about a second axis different than the first axis (e.g., the second axis is perpendicular or otherwise at an angle to the first axis). Moreover, the third section may be appropriately repeatedly mountable on and removable from the bib and/or strap sections. Additional sections may be incorporated into or onto the clip.

A second aspect of the present invention is embodied by a restraint system that includes a strap engageable with a seat occupant, and the previously described clip comprising rotatably interconnected strap and bib sections. In this aspect, the clip or mounting clip is mounted on the strap.

A number of feature refinements and additional features are applicable to the second aspect of the present invention. These feature refinements and additional features may be used individually or in any combination. The following discussion is applicable to the second aspect, up to the start of the discussion of a third aspect of the present invention.

In an embodiment, the strap may be appropriately incorporated as part of a restraint device (e.g., three point restraint device) in any type of vehicle (e.g., motor vehicle, plane, train) or as part of an infant seat or the like. In one arrangement, the strap may be in the form of a belt (e.g., shoulder harness) that may be operable to extend across the chest of a seat occupant. In other embodiments, the strap may be in the form of a lap belt. Other appropriate types of belts may be incorporated as part of the restraint system.

In another embodiment, the restraint system may have a bib situated in or otherwise detachably held by the clip. Such a bib may be in the form of any appropriate garment or body-protecting device. For instance, the bib may be in the form of a traditional cloth or paper napkin used for preventing or reducing the potential of spilled food and drinks from moving or transferring from one side of the bib to the other side of the bib (e.g., from the front side of the bib to the back side of the bib, which may be disposed adjacent to the user's body). The bib may also be in the form of a dual-layered bib having at least one liquid absorbent layer and at least one liquid repellant layer. Such an absorbent layer may face away from the body of the user so as to catch and absorb spilled drink and food, while the liquid repellant layer may face towards the user's body to prevent such spilled liquids and foods from contacting the clothes or body portions of the user.

In one embodiment, the bib may include first and second portions that may be of varying dimensions and shapes. For instance, the bib may include an upper portion (e.g., a first bib section) and a second bib portion (e.g., a second bib section). The first bib section may by engaged by the clip and have a tapering width. The second bib section may extend from the first bib section and have a width greater than an entirety of the first bib section. As an example, a width of the bib may increase along the first bib section while progressing away from the clip, and thereafter may remain constant along the second bib section. The tapered width of the first bib section may allow vehicle passengers and other users of the bib more freedom in the use of their arms than a bib having a constant width along the entire length of such bib. In other arrangements, the bib may include a third bib section with dimensions different than those of the first and/or second bib sections. For instance, the third bib section may extend from the second bib section and have a width greater than the width of the first and/or second bib sections. As an example, a width of the bib may increase along the third bib section while progressing away from the second bib section. In this regard, the third bib section may be draped over the surface of the leg(s), seat cushions and/or other vehicle equipment to prevent or reduce the potential of spilled food and drinks from staining or otherwise marring or damaging such surfaces.

A third aspect of the present invention is embodied by a method of removably securing a bib to a restraint system (e.g., in a vehicle). The method initially includes opening a strap section of a clip or mounting clip. For example, the strap section includes first and second strap sections that may be appropriately separated. Thereafter, such first and second strap sections may be sandwiched against or otherwise compressed on a strap of the restraint system, and then the strap section may be closed. If not so oriented, a bib section of the clip may be rotated so as to be in a substantially vertical orientation (e.g., a receiving space within the bib section may open downwardly). In other arrangements, the bib section may either be left in whatever orientation it was in after the strap was compressed by the strap section, or may even be rotated to a non-vertical orientation to provide a desired positioning of the bib section. In any case, a bib may be secured to the bib section.

Other methods of removably securing a bib to a restraint system are envisioned. For instance, a bib section of a clip may be appropriately removably secured to a bib and a strap section of the clip may be removably secured to a strap of the restraint system, irrespective of the order in which such bib and strap sections are respectively removably attached to the bib and strap. Thereafter and assuming the bib and strap sections are separated, the bib section may be removably attached to the strap section. The bib section may thereafter be appropriately moved (e.g., rotated) to position the bib in a desired orientation relative to a body and/or clothing portion of a passenger.

Fourth and fifth aspects of the present invention are directed to a bib. This bib includes a bib body having a top edge, a bottom edge, and a pair of sides. A longitudinal dimension may be characterized as extending between the top and bottom edges of the bib body. In one embodiment, a longitudinal axis extends between these top and bottom edges.

The fourth aspect of the present invention is directed to a bib that may be used in each of the above-noted first, second, and third aspects. The above-noted bib body includes an plurality of flexible body reinforcement members in the case of the fourth aspect (e.g., to allow the bib body to be "shaped" for any appropriate purpose; to "funnel" food particles, for instance to direct such food particles into an optional pocket that may be incorporated by the bib body).

The fifth aspect of the present invention is directed to a bib that may be used in each of the above-noted first, second, and third aspects. The above-noted bib body includes a top or upper reinforcement member in the case of the fifth aspect.

A number of feature refinements and additional features are separately applicable to each of the fourth and fifth aspects of the present invention. These feature refinements and additional features may be used individually or in any combination. The following discussion is separately applicable to each of the fourth and fifth aspects, up to the start of the discussion of a sixth aspect of the present invention. Initially, the fourth and fifth aspects may be used in combination.

The bib body may be formed from any appropriate material or combination of materials. For instance, the bib body could be in the form of a disposable (e.g., one or more thin sheets of plastic). The bib body could also be formed from a washable material or combination of materials (e.g., oil cloth; vinyl). The bib body may be formed by joining two or more sheets together in any appropriate manner (e.g., sewing, adhering, heat-sealing). In one embodiment, one or more of an upper reinforcement member, a plurality of body reinforcement members, and a plurality of pocket reinforcement members may be encased in the bib body (e.g., disposed between a pair of sheets that define at least part of the bib body).

The top edge of the bib body may be of a first width. The spacing between the opposite sides of the bib body may define a second width. In one embodiment, the second width is greater than the first width. For instance, each side of the bib body may be characterized as including a side section and a transition section, where each transition section extends from the top edge of the bib body (e.g., an end thereof) to its corresponding side section. One embodiment has each transition section being arcuately-shaped or curved progressing from the top edge of the bib body to its corresponding side edge. Another embodiment has each transition section being linear (e.g., a straight line) proceeding from the top edge of the bib body to its corresponding side edge.

The bib may include a top or upper reinforcement member. The upper reinforcement member may be disposed within about 1.25 inches of the top edge of the bib body. One embodiment has the upper reinforcement member being spaced from the top edge of the bib body (e.g., within 1.25 inches of the top edge of the bib body). Another embodiment has the upper reinforcement member being positioned at the top edge of the bib body.

The noted upper reinforcement member may be characterized as being an elongated structure (e.g., having a length dimension that is greater than, and in one embodiment substantially greater than, any other dimension of the upper reinforcement member). The upper reinforcement member may have a length dimension that extends in a lateral dimension, where the lateral dimension coincides with the side-to-side dimension of the bib (e.g., the lateral dimension being orthogonal to the above-noted longitudinal dimension). The upper reinforcement member may be characterized as extending from one side of the bib body to the opposite side of the bib body. Another characterization is that the upper reinforcement member extends along an entirety of the top edge of the bib body.

The noted upper reinforcement member may be characterized as being bendable into a predetermined shape. This predetermined shape may be at least substantially retained without continued application of any external force to the upper reinforcement member, and may allow the user to shape the upper portion of the bib body into a desired configuration (e.g., to provide/retain a bib coverage area on a user). In one embodiment, the upper reinforcement member is in the form of a pliable metal strip. In another embodiment, the upper reinforcement member is in the form of a pliable wire or the like.

Engaging the bib at any location along the length of the upper reinforcement member (e.g., using any of the mounting clips described above in relation to any of the first, second, and third aspects) should allow the bib to hang in at least generally the same orientation on a user. The upper reinforcement member may facilitate having the bib body be suspended from the mounting clip at a single location or region (whether the mounting clip engages a region having the upper reinforcement member or not). Whether the mounting clip engages a region having the upper reinforcement member, or whether the interconnection/interface between the mounting clip and the bib body is spaced from this upper reinforcement member (e.g., in the direction of a pocket incorporated by the bib body), the upper reinforcement member may be of a sufficient rigidity so that the upper portion of the bib body simply does not "flop down" onto another portion of the bib body (e.g., the upper reinforcement member may assist in retaining the bib body in proper position relative to a user).

The bib may include a plurality of body reinforcement members (e.g., flexible structures) that each extend inwardly toward the noted longitudinal axis. These body reinforcement members may extend from either of the two sides of the bib body and at least generally in the direction of the noted longitudinal axis. A first group of a plurality of body reinforcement members may extend from one side of the bib body toward the longitudinal axis, and a second group of a plurality of body reinforcement members may extend from the other side of the bib body toward the longitudinal axis. Each of these groups may have at least two body reinforcement members. Each body reinforcement member in the first group may be staggered in the longitudinal dimension compared to each body reinforcement member in the second group. In one embodiment, each body reinforcement member that extends from one side of the bib body is not collinear with any body reinforcement member that extends from the other side of the bib body.

The noted body reinforcement members may be disposed in parallel relation to each other. In one embodiment where the longitudinal reference axis is disposed equidistantly from the two sides of the bib body, none of the body reinforcement members extends all the way to the longitudinal reference axis. The bib body may be characterized as having a first zone that is located between the two sides of the bib body (e.g., equidistantly). In one embodiment, none of the plurality of body reinforcement members extends into this first zone, including where each such body reinforcement member extends from either one side of the bib body or the opposite side of the bib body.

The noted body reinforcement members each may be characterized as being bendable into a predetermined shape. This predetermined shape may be at least substantially retained without continued application of any external force to a particular body reinforcement member. In one embodiment, each body reinforcement member is in the form of a pliable metal strip. In another embodiment, each body reinforcement member is in the form of a pliable wire or the like.

The bib body may include at least one pocket. This pocket may be located so as to define a lowermost extreme of the bib body (e.g., when the pocket is formed/defined), may extend between the pair of sides of the bib body, or both. The bib body may include first and connector pairs, where the first connector pair may at least generally close one end of this pocket, and where the second connector pair may at least generally close an opposite end of this pocket. Each such connector pair may include first and second connectors that may be detachably engaged (e.g., to accommodate repeated engagement and disengagement without damaging either connector and/or the bib body). In one embodiment, each connector of each connector pair is in the form of Velcro®. Mating snaps could be used as well. In any case, the bib body may be folded onto itself and the connector pairs detachably engaged to define this pocket.

The bib body may incorporate at least one wire or other reinforcement member that defines a bottom or lower extreme of the noted pocket (e.g., when formed/defined in the above-noted manner). The pocket may also incorporate a plurality of pocket reinforcement members. In the case where the pocket includes a back pocket panel and a front pocket panel (e.g., when the bib body is folded in the above-noted manner and the two ends of the pocket are defined by separate and engaged connector pairs), each pocket reinforcement member may extend along at least part of each of the back pocket panel and the front pocket panel. The plurality of pocket reinforcement members may be characterized as being disposed parallel to one another. In one embodiment, the pocket reinforcement members may be disposed in parallel relation to the noted longitudinal reference axis, while the above-noted body reinforcement members may be disposed orthogonally to the noted longitudinal reference axis (e.g., in relation to their respective lengths dimensions).

The pocket reinforcement members each may be characterized as being bendable into a predetermined shape (e.g., at least generally U-shaped or V-shaped). This predetermined shape may be at least substantially retained without continued application of any external force to a particular pocket reinforcement member. For instance, the plurality of pocket reinforcement members may maintain the above-noted front pocket panel in spaced relation to the back pocket panel (e.g., such that the front pocket panel remains "puckered out" in relation to the back pocket panel). In any case, the bends in the various pocket reinforcement members may be located at and/or define a bottom of the pocket. In one embodiment, each pocket reinforcement member is in the form of a pliable metal strip. In another embodiment, each pocket reinforcement member is in the form of a pliable wire or the like.

The bib of the fourth and fifth aspects may be used in combination with any of the mounting clips discussed above in relation to the first, second, and/or third aspects of the present invention. The mounting clip may detachably engage the bib such that there is a single mechanical purchase (e.g., area of engagement) between the mounting clip and the bib such that the bib is in effect suspended from a single location or region. Engaging the bib at any location along the noted upper reinforcement member (e.g., using any of the clips described in relation to any of the first, second, and third aspects) should allow the bib to hang in at least generally the same orientation on a user.

A sixth aspect of the present invention is directed to a bib system or assembly in the form of a bib and a mounting clip. The bib includes a bib body having a top edge, a bottom edge, and a pair of sides. The bib further includes an elongated upper reinforcement member that is incorporated by the bib body, that is disposed within 1.25" of the top edge of the bib body, and that has a length dimension that extends in a lateral dimension (the "lateral dimension" extending from one side of the bib body to a corresponding portion on the opposite side of the bib body). The mounting clip includes a first portion that is interconnected with the bib in any appropriate manner, as well as a separate second portion that is attachable to an article from which the bib is to be suspended. The bib is suspended from a single location or region by the mounting clip.

A number of feature refinements and additional features are applicable to the sixth aspect of the present invention. These feature refinements and additional features may be used individually or in any combination. The following discussion is applicable to the sixth aspect, up to the start of the discussion of a seventh aspect of the present invention. Initially, the bib addressed above in relation to the fourth and fifth aspects may be used by the bib assembly of this sixth aspect. The mounting clip addressed above in relation to the first, second, and third aspects may be used by the bib assembly of this sixth aspect.

The mounting clip may be detachably engaged with the bib in any appropriate manner. For instance, the mounting clip may include what may be characterized as first and second clamping sections (e.g., the noted first and second portions, respectively, of the mounting clip). The first clamping section of the mounting clip (e.g., a clothes-pin type configuration or the like) may detachably connect the mounting clip to the bib body, while the second clamping section (e.g., another clothes-pin type configuration or the like) is available to be detachably engaged with an article from which the bib body is to be suspended.

The second portion of the mounting clip (that which is available to attach to an article from which the bib is to be suspended) could utilize first and second clamping members that are movable apart to allow an article to be disposed therebetween (e.g., a clothes-pin type configuration or the like), and that are movable toward one another to retain the article between the first and second clamping members so as to suspend the bib from this article. Such a mounting clip could be inseparably incorporated by the bib body (e.g., where the mounting clip is permanently mounted to the bib body; where the mounting clip is not intended to be separated or removed from the bib body; where the connection between the mounting clip and bib body is other than a detachable connection). Another option is for the mounting clip with the first and second clamping members to include at least one connector. This connector (e.g., the noted first portion of the mounting clip) could detachably engage with another connector that is incorporated by the bib body (e.g., the mounting clip could incorporate a first snap member (e.g., male or female) that may detachably engage with another snap member (e.g., male or female) incorporated by the bib body). The bib body could include a plurality of connectors such that the mounting clip could be detachably mounted to the bib at a number of different locations.

The bib assembly may be characterized as including an interconnection between the bib body and the mounting clip. The first portion of the mounting clip may be part of and/or define this interconnection. The second portion of the mounting clip (being separate from the first portion) would not be part of this interconnection, and again is attachable to an article form which the bib is to be suspended. A common structure of the mounting clip does not function as each of the first and second portions.

A seventh aspect of the present invention is directed to a bib system or assembly in the form of a bib and a mounting clip. The mounting clip includes a first portion that is interconnected with the bib, along with a separate second portion that includes first and second clamping members that are movable apart to allow an article to be disposed therebetween (e.g., a clothes-pin type configuration or the like), and that are movable toward one another to retain the article between the first and second clamping members so as to allow the bib to be suspended from this article. That is, the first and second clamping members do not establish the interconnection between the mounting clip and the bib. Instead, the first and second clamping members are available to engage an article when the mounting clip is interconnected with the bib, such that the bib would then be suspended from this article by the mounting clip. Further in this regard, the bib is suspended from a single location or region by the mounting clip.

A number of feature refinements and additional features are applicable to the seventh aspect of the present invention. These feature refinements and additional features may be used individually or in any combination. The following discussion is applicable to the seventh aspect, up to the start of the discussion of an eighth aspect of the present invention. Initially, the bib addressed above in relation to the fourth and fifth aspects may be used by the bib assembly of this seventh aspect. The mounting clip addressed above in relation to the first, second, and third aspects may be used by the bib assembly of this seventh aspect.

The first and second clamping members may define one clamping section for the mounting clip (e.g., the noted second portion of the mounting clip). The mounting clip may include another, separate clamping section to engage the bib and establish the noted interconnection between the bib and the mounting clip (e.g., the noted first portion of the mounting clip). For instance, this additional clamping section may include another pair of clamping members that are movable apart to allow a portion of the bib to be disposed therebetween (e.g., a clothes-pin type configuration or the like), and that are movable toward one another to retain part of the bib between this pair of clamping members.

The mounting clip could be inseparably incorporated by the bib body (e.g., where the mounting clip is permanently mounted to the bib body; where the mounting clip is not intended to be separated or removed from the bib body; where the connection between the mounting clip and bib body is other than a detachable connection). Another option is for the mounting clip to include a connector (in addition to the first and second clamping members and, for instance, in the form of the noted first portion of the mounting clip). This connector could detachably engage with another connector that is incorporated by the bib (e.g., the mounting clip could incorporate a first snap member (e.g., male or female) that may detachably engage with another snap member (e.g., male or female) incorporated by the bib). The bib could include a plurality of connectors to allow the mounting clip to be installed on the bib at a number of different locations.

An eighth aspect of the present invention is directed to a bib having a bib body and a mounting clip that is incorporated by the bib body. Although not required by this eighth aspect, the features of the bib body discussed above in relation to each of the fourth and fifth aspects may be used by this eighth aspect (e.g., the bib body of this eighth aspect could include one or more of an upper reinforcement member, a plurality of body reinforcement members, and a plurality of pocket reinforcement members). In any case, the mounting clip includes first and second clamping members that are movable apart to allow an article to be disposed therebetween, and that are movable toward one another to retain the article between the first and second clamping members so as to allow the bib to be suspended from this article. That is, the first and second clamping members do not establish the interconnection between the mounting clip and the bib body in the case of the eighth aspect. Instead, the first and second clamping members are available to engage an article when the mounting clip is interconnected with the bib, such that the bib would then be suspended from this article by the mounting clip.

One option for incorporating the mounting clip with the bib body in the case of the eighth aspect is for the mounting clip to be inseparably incorporated by the bib body. That is, the mounting clip may be integrated with the bib body in this case so as to not accommodate repeated attachments and detachments between the mounting clip and the bib body. An article clamping section of such a mounting clip could be movable relative to the bib body in one or more dimensions (e.g., a rotatable connection, for instance provided by mating snap members; using one or more ball and socket joints or the like), or at least part of the mounting clip could be maintained in a fixed position relative to the bib body (e.g., a money clip configuration fixed to the bib body). The mounting clip may be of any appropriate configuration for purposes of this option for the eighth aspect.

Another option for incorporating the mounting clip with the bib body in the case of the eighth aspect is for the mounting clip and bib body to include mating connectors (e.g., snaps). The mounting clip could include a single connector. The bib body could include one or more mating connectors. Using multiple connectors for the bib body would allow the mounting clip to be installed at a variety of locations on the bib body. The mounting clip may also be of any appropriate configuration for purposes of this option for the eighth aspect.

A number of feature refinements and additional features are separately applicable to each of above-noted first, second, third, fourth, fifth, sixth, seventh, and eighth aspects of the present invention as well. These feature refinements and additional features may be used individually or in any combination in relation to each of the first, second, third, fourth, fifth, sixth, seventh, and eighth aspects. Initially, any feature that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a clip includes "a spring" alone does not mean that the clip includes only a single spring). Use of the phrase "at least generally" or the like in relation to a particular feature encompasses the corresponding characteristic and insubstantial variations thereof (e.g., indicating that a part is at least generally cylindrical or the like encompasses the part actually being cylindrical). Finally, a reference of a feature in conjunction with the phrase "in one embodiment" does not limit the use of the feature to a single embodiment.

BRIEF DESCRIPTION OF THE FIGURES

FIG. 4a is a side view of the clip of FIG. 2, showing a first clip section in a bib and/or strap retaining position.

FIG. 4b is another side view of the clip of FIG. 2, showing the first clip section in a bib and/or strap installation position.

DETAILED DESCRIPTION

Figure 1:
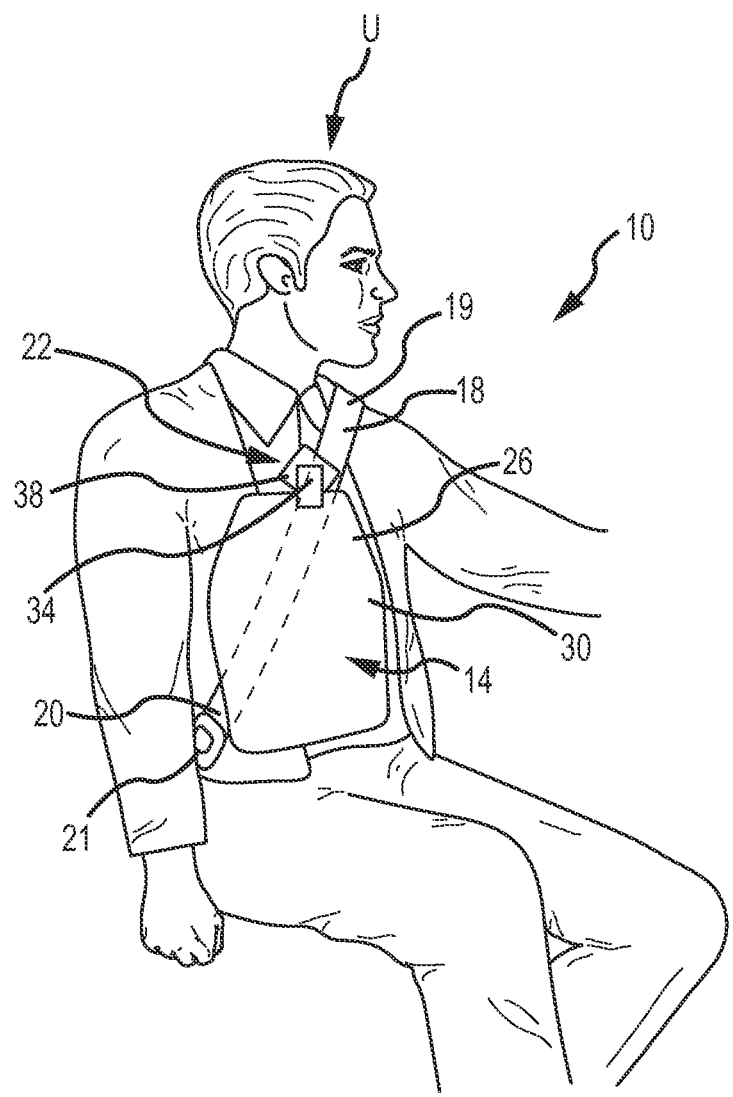
FIG. 1 is a perspective view of one embodiment of a restraint system including a strap, a bib, and a clip.
Figure 2:
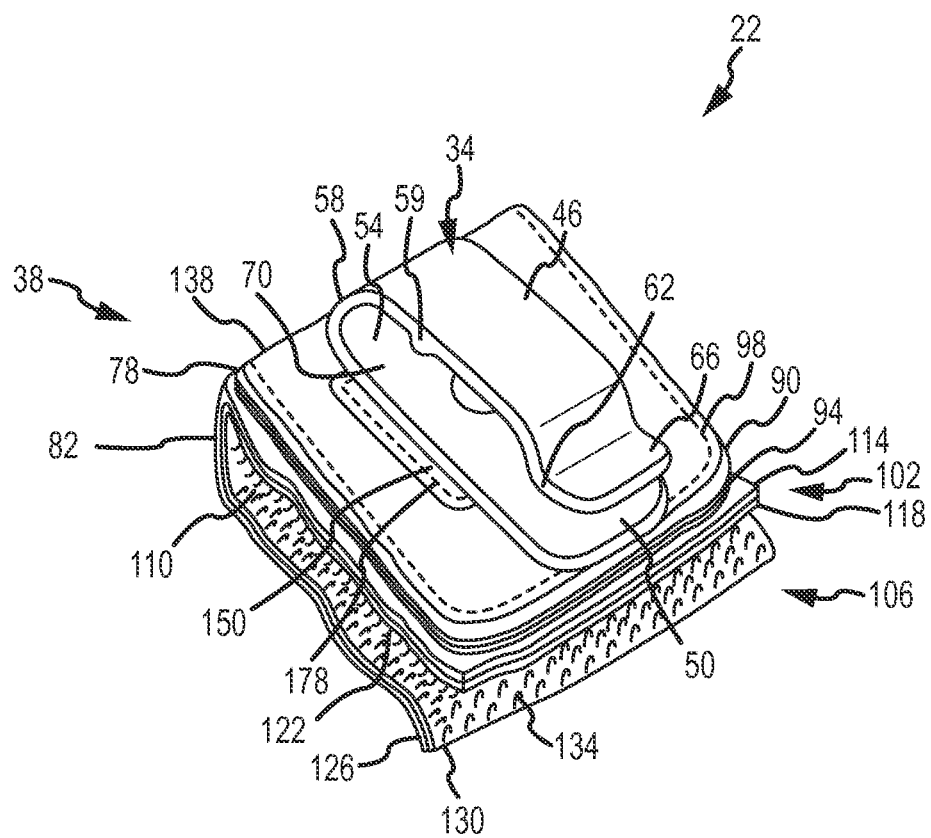
FIG. 2 is another more detailed perspective view of the clip used by the restraint system of FIG. 1.

A perspective view of one embodiment a restraint system 10 is illustrated in FIG. 1. This restraint system 10 may be utilized by a user U (e.g., a seat occupant) to position a bib 14 or other appropriate garment protecting device across a portion of the user's chest, upper torso, and/or other appropriate body portion(s). In this regard, the restraint system 10 may be used with the bib 14 to prevent or otherwise inhibit food, beverages or other substances from contacting the user's clothing and garments. The restraint system 10 broadly includes a strap 18 and a clip or mounting clip 22. As will be more fully described below, the clip 22 may serve to releasably mount or attach the bib 14 to the strap 18 to position the bib 14 over a user's chest or other appropriate body portion (e.g., legs), and when not in use, the clip 22 may be stored in any appropriate location (e.g., on a user's belt; on the strap 18; in a glove compartment). The clip 22 may also be slid along the strap 18 as desired/required.

The strap 18 may be in the form of a shoulder harness or belt that may be used as part of a three-point restraint device in a vehicle. For instance, the strap 18 may be connected at one end 19 to any appropriate retraction mechanism (e.g., spool and rewind spring assembly, not shown) and at another end 20 to a buckle arrangement 21 (e.g., buckle and tongue assembly). The strap 18 may also be in the form of other types of belts and restraints (e.g., lap belt). The clip 22 may be used with any appropriate restraint, such as in conjunction with an infant harness for a car seat. The clip 22 may also be used to attach to clothing.

With continued reference to FIG. 1, the bib 14 of the restraint system 10 may include an upper (e.g., first) portion or section 26 and a lower (e.g., second) portion or section 30. As illustrated, the upper portion 26 may be tapered as it extends away from the lower portion 30. Stated otherwise, as the bib 14 hangs or otherwise extends from the clip 22 while the bib 14 and clip 22 are in use (e.g., the upper portion 26 is engaged with the clip 22), a width of the upper portion 26 may gradually increase along its length from the clip 22 to the lower portion 30 (e.g., as one progresses away from the clip 22). Moreover, a width of the lower portion 30 may be at least generally constant over an entire length of the lower portion 30, although such may not be required in all instances. As such, numerous advantages may result. The tapering design of the upper portion 26 may allow the user U increased freedom in the use of his or her arms while driving or else at least being a passenger or seat occupant in a vehicle. More specifically, as the user U lifts or otherwise manipulates his or her arms while utilizing the restraint system 10, the bib 14 may not impede such motion of the arms and/or arm movement should not appreciably move the bib 14. Additionally, the generally constant width of the lower portion 30 may serve to increase the coverage area of the bib 14 over the torso portion of the user U, and may lead to greater protection of the user U from spilled food, beverages, makeup, and the like. Although the edges of the upper portion 26 that defined its tapered configuration are linear in the illustrated embodiment, such edges may be of any appropriate shape (e.g., curved). Other shapes and dimensions of the bib 14 are also contemplated.

The bib 14 may be made of any appropriate material (e.g., pliable) and may include at least some liquid repellency properties. For instance, the bib 14 may include a lower layer (not shown) of a water repellent type material such as nylon sheath, plastic sheath, combinations thereof, and the like. Such a layer may generally face towards the user U and may serve to prevent liquids and other moist food and objects from contacting a portion of the user U, or at least reduce the likelihood of such events from occurring. An upper layer (not shown) may be disposed or attached over the lower layer (the upper layer being able to face away from the user U in use), and may serve to absorb or otherwise receive liquids, food particles and the like, may serve to prevent or inhibit such liquids and food particles from spilling onto other portions of the user U not covered by the bib 14, or both. For instance, the upper layer may include at least one of cotton, open cell foam, towel-type materials, and the like, and may be appropriately attached to the lower layer such as by gluing, stitching, and the like. In other embodiments, the bib 14 may be in the form of a napkin (e.g., paper and/or cloth) or other appropriate garment and/or body protecting devices. The bib 14 may be a reusable (e.g., washable) or disposable item.

With continued reference to FIG. 1, along with FIGS. 2-8, the clip 22 of the restraint system 10 is illustrated and may be broadly construed as having a first clip section 34, a second clip section 38, and a pivot assembly 42 that may be operable to rotatably interconnect the first and second clip sections 34, 38. The first and second clip sections 34, 38 being rotatably interconnected does not require a full 360° of relative motion between these parts, although such may be utilized. As shown in FIG. 1, the first clip section 34 may be detachably or releasably attached to the bib 14 and may be in the form of a "bib section," while the second clip section 38 may be detachably or releasably attached to the strap 18 and may be in the form of a "strap section". In a more typical arrangement, however, the first clip section 34 may be detachably or releasably attached to the strap 18 and thus may be in the form of a "strap section," while the second strap section 38 may be detachably or releasably attached to the bib 14 and thus may be in the form of a "bib section". In either arrangement, the clip 22 may broadly serve to repeatedly detachably or releasably attach the bib 14 to the strap 18. Moreover, either or both the bib 14 or the strap 18 may be repeatedly mountable on and/or removable from either the first and/or section clip section 34, 38.

The first clip section 34 may include first and second clamp portions or clamping members 46, 50 that may be movable relative to each other with a receiving space 54 formed between the first and second clamp portions 46, 50 for accepting the strap 18, bib 14, etc. As shown, the first clip section 34 may be in the form of a one-piece "money clip". A biasing section 58 (e.g., spring; living hinge) interconnects the first and second clamp portions 46, 50 and may serve to provide a bias or compressive force between the first and second clamp portions 46, 50 so as to bias the first and second clamp portions 46, 50 to a strap and/or bib retaining position as illustrated in FIG. 4a (not all features of the clip 22 being illustrated in FIG. 4a for clarity). Stated otherwise, the biasing section 58 may tend to urge the first and second clamp portions 46, 50 back toward a static position when deflected from the static position. As such, at least a portion of the biasing section 58 may engage in elastic deformation. Thus and as will be later described, when a user applies an appropriate force to separate the first and second clamp portions 46, 50 into a strap and/or bib loading position as shown in FIG. 4b (not all features of the clip 22 being illustrated in FIG. 4b for clarity), the user may insert an object (e.g., strap 18, bib 14) into the receiving space 54. In this regard, the first and second clamp portions 46, 50 may accommodate installation of the strap 18 and/or bib 14. Thereafter, the biasing section 58 may be operable to compress the first and second clamp portions 46, 50 towards each other to releasably or detachably attach the object to the first strap section 34 when the user releases the above-mentioned applied force. Although the first clamp portion 46, second clamp portion 50, and biasing section 58 have been described as separate parts, they may be associated with a common structure. For instance, the first clamp portion 46, second clamp portion 50 and biasing section may be appropriately formed as a one-piece structure.

The first clamp portion 46 of the first clip section 34 may be in the form of an elongated member having first and second strap interface sections 59, 62 that may be spaced from each other, and may include a finger catch 66 that may be appropriately lifted or otherwise manipulated by a user to separate the first clamp portion 46 from the second clamp portion 50 against the compressive force of the biasing section 58. The first and second strap interface sections 59, 62 may be operable to contact the object (e.g., strap 18) situated within the receiving space 54. In this regard, the first and second strap interface sections 59, 62 may be operable to exert a greater force on the strap 18 than a portion (not labeled) of the first clip section 34 that extends and/or is positioned between the first and second strap interface sections 59, 62. In use and after the first and second clamp portions 46, 50 have been separated to the loading position illustrated in FIG. 4b, a user may insert the strap 18 into the receiving space 54 until the strap 18 contacts or is substantially adjacent the biasing section 58 (or otherwise into a suitable position within the receiving space 54). Once the first and second clamp portions 46, 50 are allowed to return to an original position as illustrated in FIG. 4a (e.g., via the action of the biasing section 58), the first strap interface section 59 may be operable to urge the strap 18 against the second clamp portion 50 and thus restrict or otherwise reduce relative movement of the strap 18 with respect to the first clip section 34.

Moreover, the second strap interface section 62 may serve a number of functions. If a portion of the strap 18 is situated between the second strap interface section 62 and the second clamp portion 50 after the strap 18 has been inserted into the receiving space 54, the second strap interface section 62 may be operable to urge the strap 18 against the second clamp portion 50 and thus restrict or otherwise reduce relative movement of the strap 18 with respect to the first clip section 34. Additionally, if the entire width of the strap 18 is situated between the biasing section 58 and the second strap interface section 62 (e.g., the strap 18 is not situated between the second strap interface section and the second clamp portion 50) after the strap 18 has been inserted into the receiving space 54, the second strap interface section 62 may be operable to maintain contact with the second clamp portion 50 and thus function to serve as a stop to prevent (or at least reduce the potential of) the strap 18 from exiting the receiving space 54 in a direction from the biasing section 58 to the second strap interface section 62. It will be appreciated that the first and/or section strap interface sections 59, 62 may be designed to exert any desired level of gripping pressure against a strap 18 or other object disposed within the receiving space 54, and may take various shapes, dimensions and forms. For instance, the first and/or second strap interface sections may be in the form of one or more protrusions, teeth, spring-loaded ball bearings, or the like. Additional strap interface sections may be incorporated with the clip 22.

The second clamp portion 50 of the first clip section 34 may be in the form of an elongated member having a receiving surface 70 for receiving or accepting an object. The receiving surface 70 may be substantially planar to inhibit or otherwise reduce marring or degradation of a strap 18 and/or bib 14 received thereon. Moreover, the receiving surface 70 may include at least one pivot aperture 74 extending therethrough and a pair of adjustment protrusions 75 (more or fewer than a pair may be provided) on an underside thereof that will be more fully described below. The first clip section 34 may be constructed of any appropriate material such as metals (e.g., stainless steel), plastics, and the like. While the first and second clamp portions 46, 50 have been described as being biased together by way of a biasing section 58 which may be in the form of a spring, other arrangements are envisioned. For instance, each of the first and second clamp portions 46, 50 may additionally or alternatively include magnetic members (e.g., magnets, metals) that may be operable to pull the first and second portions 46, 50 towards each other or otherwise force or urge the first clamp portion 46 against the second clamp portion 50. Other embodiments envision that the first clip section 34 may include any other structure or design operable to releasably hold or mount a bib 14, strap 18, or the like thereto.

The second clip section 38 may include first and second portions 78, 82 that may be appropriately connected to each other such as by adhesives, stitching, and/or the like. The first portion 78 may include first and second members or layers 90, 94, each of which may be in the form of a generally planar member that may be attached to each other such as by stitches 98 or in any other appropriate manner. In one embodiment, a stiffening element (e.g., cardboard, not shown) may be disposed between the first and second members 90, 94, and each of the first and second members 90, 94 may be made of plastic or vinyl for instance (or any other appropriate material). In any case, a receiving area (not shown) may be formed between the first and second members 90, 94 for accepting a portion of a pivot pin 146 as will be described below.

The second portion 82 may include first and second clamp or clamping members 102, 106 that may be pivoted or moved relative to each other, and a receiving space 110 that may formed between the first and second clamp members 102, 106 for accepting an object (e.g., bib 14, strap 18) upon separation of the first and second clamp members 102, 106 as will be described below. In this regard, moving the first and second members 102, 106 may accommodate installation of the bib 14 or strap 18 within the second clip section 38. Although the second clip section 38 has been described above as including the first portion 78 with the receiving area for accepting a portion of a pivot assembly 42, the second clip section 38 in other embodiments may not include a first portion 78. For instance, the second clip section 38 may only include a second portion 82 that may serve to accommodate installation of the bib 14 and/or strap 18 within the second clip section 38 and thus the clip 22. In this regard, a portion of the pivot assembly 42 (e.g., pivot pin 146) may be embedded within the first clamp member 102. Further embodiments envision that a portion of the pivot assembly 42 may be embedded or otherwise received within other portions of the second clip section 38 in any appropriate manner.

The first clamp member 102 may be in the form of any appropriate device. For instance, the first clamp member 102 may include a first layer 114 and a second layer 118 that may be appropriately attached (e.g., non-movably) to each other (e.g., by stitching, bonding) and may form a receiving area (not shown) therebetween for receiving or otherwise holding a magnetic member (not shown), the purpose of which will be described below. The first layer 114 may be constructed of any appropriate material, and in one embodiment may be in the form of a pliable planar base layer (e.g., plastic leather, vinyl) bonded over a web of any type of foam material. The first layer 114 may be appropriately attached or bonded (e.g., by adhesive) to the second member 94 of the first portion 78, or may even accept a portion of the pivot assembly 42 to pivotally connect the second clip section 38 to the first clip section 34. The second layer 118 may also be constructed of any appropriate material, and may be in the form of a pliable planar base layer (e.g., vinyl, plastic leather) with hook members 122 (loop members may also be used) disposed on one surface of the base layer and a foam material disposed on another surface of the base layer. In other embodiments, the first clamp member 102 may be constructed of only a single layer or member which may include hook and/or loop members on a surface thereof. In such an embodiment, a portion of the pivot assembly 42 (e.g., pivot pin 146) could be embedded within such a single layer. Such a single layer could itself be manufactured of a magnetic member (e.g., magnet).

The second clamp member 106 may also be in the form of any appropriate device. For instance, the second clamp member 106 may include a first layer 126 and a second layer 130 that may be appropriately attached (e.g., non-movably) to each other (e.g., by stitching, bonding) and may form a receiving area (not shown) therebetween for receiving or otherwise holding a magnetic member (not shown) that may be operable to appropriately interact with the magnetic member of the first clamp member 102. The first layer 126 may be constructed of any appropriate material, and in one embodiment may be in the form of a pliable planar base layer (e.g., plastic, leather, vinyl) bonded over a web of any type of foam material. The second layer 130 may also be constructed of any appropriate material and may be in the form of a pliable planar base layer (e.g., plastic leather, vinyl) with hook members 134 (loop members may be also be used) disposed on one surface of the base layer (operable to engage with the hook members 122 of the first member 102) and a foam material disposed on another surface of the base layer.

In some embodiments, at least one of the first and/or second clamp members 102, 106 may be constructed of only a single layer or member that may include hook and/or loop members on a surface thereof. Such a single layer could additionally or alternatively be manufactured of a magnetic member (e.g., magnet). In the situation where the first clamp member 102 is constructed of a single layer or member, a portion of the pivot assembly 42 (e.g., pivot pin 146) could be embedded within such a single layer. Additional or fewer layers and/or features may be incorporated with the first and/or second clamp members 102, 106.

The first and second clamp members 102, 106 may be appropriately connected by any device or connection that allows the first and second clamp members 102, 106 to pivot or move (e.g., flex) with respect to one another and thus form receiving space 110 therebetween for accepting an object (e.g., bib 14). For instance, at least a portion of the first and second clamp members 102, 106 may be appropriately attached at a first end 138 of the second strap section 38 such as by adhesives, stitching and the like. Moreover, the first and second clamp members 102, 106 may be biased to a strap and/or bib retaining position as illustrated in FIG. 5*a* (not all features of the clip 22 being illustrated in FIG. 5*a* for clarity) by way of a biasing force. For instance, the biasing force may be created and/or applied owing to the interaction of the magnetic members of the first and second clamp members 102, 106, and the interaction of the hook members 122, 134. For instance, first clamp member 102 may include any appropriate magnet (e.g., flexible, ceramic, ferrite) located within its above-described receiving area, and the second clamp member 106 may have any appropriate ferromagnetic material (e.g., iron, nickel) located within its above-described receiving area. As previously described, at least one of the first and/or second clamp members 102, 106 may include a member or layer that is constructed of a magnetic member. As such, the first and/or second clamp member 102, 106 may or may not include a receiving space situated therein.

Figure 5B:
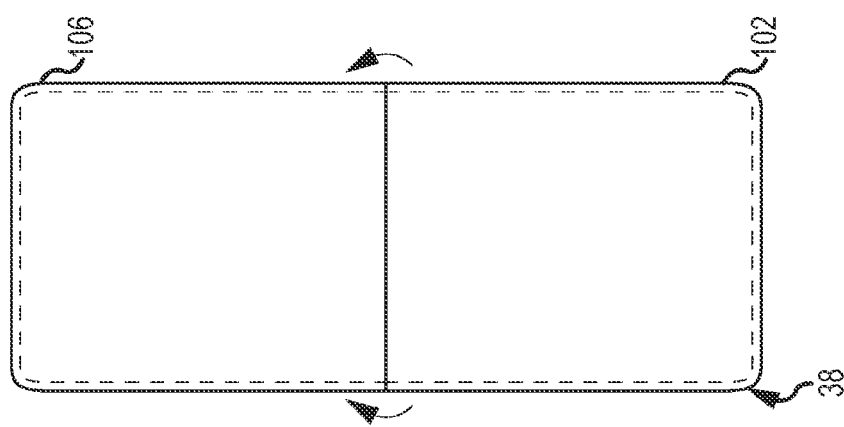
FIG. 5b is another bottom view of the clip of FIG. 2, showing the second clip section in a bib and/or strap installation position.
Figure 5A:
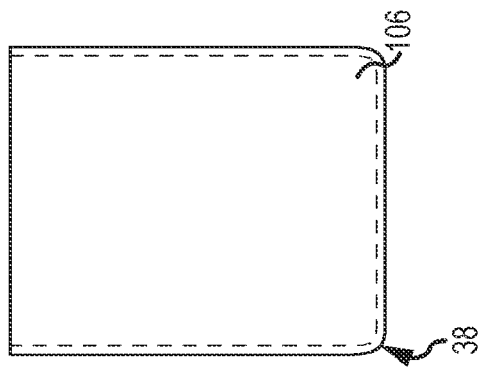
FIG. 5a is a bottom view of the clip of FIG. 2, showing a second clip section in a bib and/or strap retaining position.

In use, a user may appropriately grasp one of the first and second clamp members 102, 106 and pull or push the other of the first and second clamp members 102, 106 against the interaction of the magnet members and the hook members 122, 134 to separate the first and second clamp members 102, 106 into a loading position and accordingly expose receiving space 110 as illustrated in FIG. 5*b* (not all features of the clip 22 being illustrated in FIG. 5*b* for clarity). Thereafter, the user may insert any appropriate object (e.g., bib 14) into the receiving space 110, preferably until such object abuts or is substantially adjacent to the first end 138 of the second strap section 38. The user may then either release the first and second clamp members 102, 106 or else urge one of the first and second clamp members 102, 106 towards the other of the first and second clamp members 102, 106 to allow the magnetic members to be attracted to each other and exert the biasing force against the bib 14. Additionally, the magnetic attraction of the magnetic members may also be operable to urge the hook members 122, 134 into gripping contact with the bib 14. At this point, the bib 14 may be considered to be releasably or detachably attached or mounted to the second clip section 38, and thus the clip 22. The biasing force may also be created or applied by other arrangements. For instance, a mechanical device such as a spring may be incorporated with the second clip section 38 that would tend to create or provide a biasing force tending to urge the first and second clamp members 102, 106 together.

The second clip section 38 thereby may be characterized as including first and second clamp members 102, 106 that are movable between an open or "loading" position, and a closed or retaining position, and furthermore that are magnetically attracted to each other at least in the closed position (e.g., to retain a strap 18 or bib 14 between the clamp members 102, 106 by the retention or clamping force provided by their magnetic attraction). At least one of the first and second clamp members 102, 106 may incorporate one or more magnets in any appropriate manner to provide the noted magnetic interaction between the first and second clamp members 102, 106. Although a hook and loop fastening arrangement could be used on the interfacing surfaces of the clamp members 102, 106, such is not required in all instances. The above-described first clip section 34 of the clip 22 could also be in the form of the first clamp member 102 and the second clamp member 106 (e.g., the clip 22 could be in the form of a pair of clip sections that are rotatably interconnected, with each clip section including a pair of members that may be moved between open and closed positions, and that are magnetically attracted to each other at least in the closed position).

Figure 3:
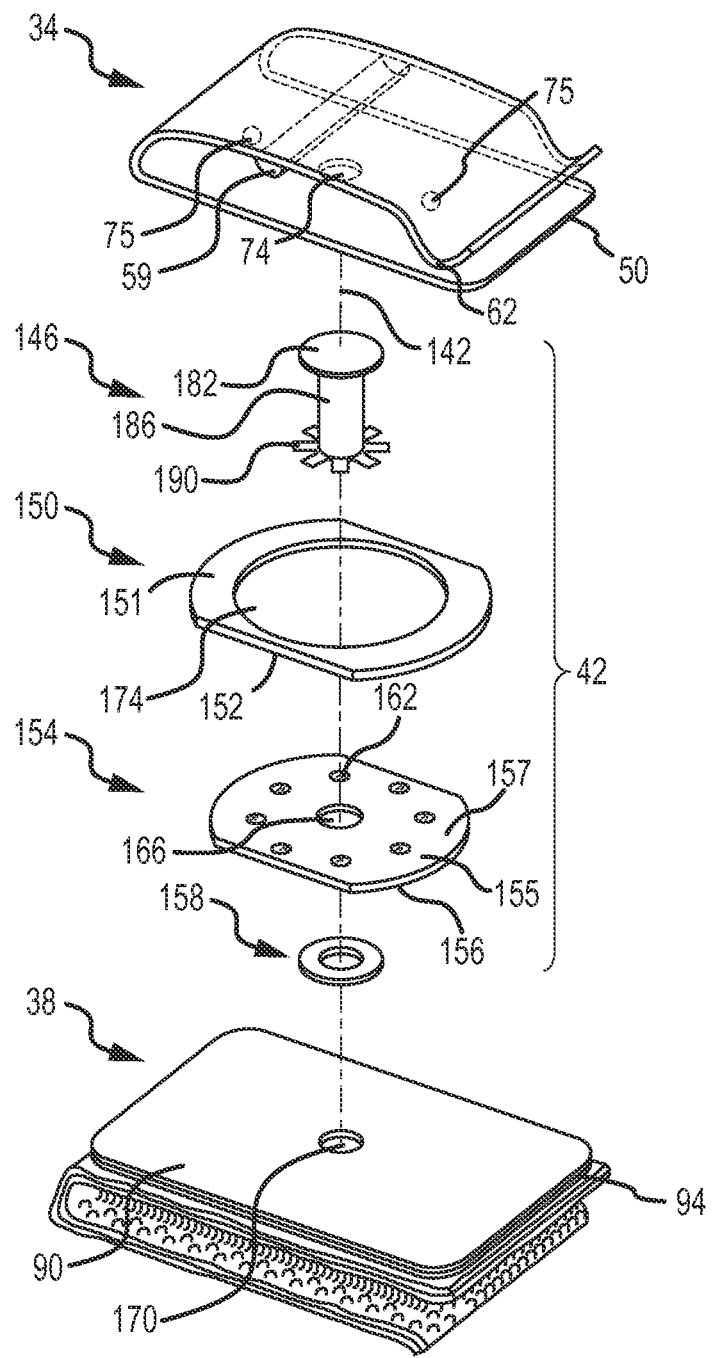
FIG. 3 is an exploded, perspective view of the clip of FIG. 2.

With reference to FIGS. 1-3, 6*a* and 6*b*, and with particular reference to FIG. 3, the clip 22 additionally may include a pivot assembly 42 that may be operable to rotatably interconnect the first and second clip sections 34, 38 such that the first and second clip sections 34, 38 may be operable to swivel about a first axis 142. Any appropriate arrangement may be utilized for the pivot assembly 42. In this regard, the pivot assembly 42 may be operable to allow one of the first and second clip sections 34, 38 to be rotated relative to the other of the first and second clip sections 34, 38 between a plurality of predetermined positions. As an example, the pivot assembly 42 may broadly include a pivot pin 146, a covering member 150, an adjustment plate 154, and a washer 158. As will be described below, the pair of adjustment protrusions 75 situated on the underside of the second portion 50 of the first clip section 34 may be operable to be seated in respective pairs of a plurality of adjustment apertures 162 situated through the adjustment plate 154 to define the plurality of predetermined positions. It is envisioned that the plurality of adjustment apertures 162 may take other forms such as depressions, slots, and/or the like.

The adjustment plate 154 may be in the form of a generally circular or oval-shaped plate of any appropriate material (e.g. metallic, plastic) with top and bottom surfaces 155, 156. A central bore 166 may extend through the middle of the adjustment plate 154 and may be surrounded by the plurality of adjustment apertures 162. An outer surface 157 may be situated on the top surface 155 outside of the adjustment apertures 162. The adjustment plate 154 may be mounted on top of the first member 90 such that the central bore 166 is aligned over a corresponding pivot bore 170 that extends through the first member 90 and into the receiving area between the first and second members 90, 94. The adjustment plate 154 may be operable to be appropriately non-rotatably mounted to a top portion (not labeled) of the first member 90. In other words, the adjustment plate 154 may be mounted so that it cannot rotate relative to the second clip section 38 as will be shown below.

The covering member 150 may be a generally pliable planar member (e.g., plastic, vinyl) of any appropriate shape having top and bottom surfaces 151, 152 with a central bore 174 extending therethrough. After the adjustment plate 154 has been disposed over the top of the first member 90, the covering member 150 may be placed over the adjustment plate 154 such that: a) the central bore 174 of the covering member 150 is aligned over both the central bore 166 and adjustment apertures 162 of the adjustment plate 154; and b) a portion of the bottom surface 152 of the covering member 150 is in contact with a portion of the outer surface 157 of the adjustment plate 154. Thereafter, the covering member 150 may be appropriately attached to the top surface of the first member 90 such as by stitching 178 (see FIG. 2) or in any other appropriate manner (e.g., adhesives, staples). Because a bottom surface 152 of the covering member 150 is in contact with the outer surface 157 of the adjustment plate 154, the adjustment plate 154 may be inhibited from rotating relative to the second clip section 38. In other embodiments, a portion of the bottom surface 156 of the adjustment plate 154 may be appropriately non-rotatably attached to the first member 90, such as by adhesives, welding, etc. In further embodiments, a depression (not shown) may be formed in a top surface of the first member 90 that corresponds in shape to the adjustment plate 154. The adjustment plate 154 may then be situated within the depression and covered by covering member 150 to prevent the adjustment plate 154 from rotating relative to the second clip section 38. Other arrangements are envisioned to maintain the adjustment plate 154 in a fixed position relative to the first member 90.

The pivot pin 146 may include a head 182 with a shaft 186 extending from the head 182. The diameter of the shaft 186 may be slightly smaller than that of the pivot aperture 74 and central bore 166. Thus, in assembly the shaft 186 may be inserted: a) into the pivot aperture 74 from a top side to the underside of the second portion 50 of the first clip section 34; and then b) through the central bore 174 of the covering member 150, central bore 166 of the adjustment plate 154, pivot bore 170 in the first member 90, and into the receiving area between the first and second members 90, 94 of the first portion 78 of the second clip section 38. It is noted that the first and second members 90, 94 may in some embodiments not be fully stitched or otherwise appropriately attached to each other until after the pivot assembly 42 has been fully assembled so as to provide access to the receiving area.

Once a portion of the shaft 186 of the pivot pin 146 has been inserted into the receiving area between the first and second members 90, 94 of the second clip section 38 as previously described, the washer 158 may be appropriately slid onto or over the end of the shaft 186 within the receiving area (e.g., from underneath the first member 90). At this point, a user or assembler may appropriately pull on the end of the shaft 186 in a direction from a top portion of the first member 90 towards the receiving area which will correspondingly clamp or sandwich the section portion 50 of the first clip section 34, the covering member 150 and the adjustment plate 154 between the head 182 of the pivot pin 146 and the first member 90 of the second slip section 38. Thereafter, the user or assembler may appropriately manipulate the end of the shaft 186 to prevent the shaft 186 from sliding within the pivot bore 170, central bore 166, central bore 174 and pivot aperture 74 in a direction from the receiving area towards the first clip section 34. For instance, a portion of the end of the shaft 186 may be appropriately formed so as to have an expanded portion 190 having a diameter or width dimension that is at least somewhat larger than the diameter of the pivot bore 170. In some embodiments, a portion of the end of the shaft 186 may be appropriately stamped, pressed or otherwise manipulated to form of a series of flared portions as illustrated in FIG. 3. In other embodiments, the expanded portion 190 illustrated in FIG. 3 may not be formed until after the shaft 186 has been inserted into the receiving area between the first and second members 90, 94. In even further embodiments, the expanded portion 190 may be formed before the shaft 186 is inserted into the receiving area so long as the expanded portion 190 may be urged through the pivot bore 170.

Figure 7:
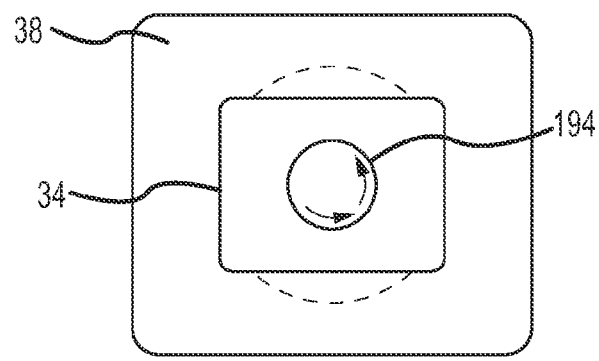
FIG. 7 is a top view of the clip of FIG. 2, illustrating an access hole.

In other embodiments, a portion of the end of the shaft 186 received within receiving area may be threaded (not shown), and a nut (not shown) may be threaded onto the end of the shaft 186 within the receiving area to sandwich the section portion 50 of the first clip section 34, the covering member 150 and the adjustment plate 154 between the head 182 of the pivot pin 146 and the first member 90 of the second clip section 38. In such an arrangement, the head 182 of the pivot pin 146 may have appropriately formed slots or depressions for any type of tool (e.g., flathead screwdriver, Philips screwdriver) that would allow the pivot pin 146, and thus the entire pivot assembly 42, to be loosened or tightened by such tool. With reference to FIG. 7 (not all features of the clip 22 being illustrated in FIG. 7 for clarity), an access aperture 194 may be formed through the first portion 46 of the first clip section 34 that may be aligned over the pivot aperture 74 to allow a user to access the head 182 of the pivot pin 46 with a tool through such access aperture 194.

In some arrangements, the adjustment plate 154 and covering member 150 may be appropriately disposed over and attached to a portion of the first clamp member 102 instead of over a top surface of the first member 90 of the first portion 78. In such an arrangement, the first portion 78 may not even be provided, and the pivot pin 146 may appropriately extend through the adjustment plate 154 and covering member 150 and be attached to or embedded within the first clamp member 102 using one of the above-described arrangements or other arrangements. Regardless of how the pivot assembly 42 is attached to the various portions of the clip 22, the pivot assembly allows the first and second clip portions 34, 38 to pivot relative to each other.

After the pivot assembly 42 has been appropriately assembled and the first and second members 90, 94 of the second clip section 38 have been appropriately attached or connected to each other as described above, the adjustment protrusions 75 will either be engaged with the top surface 155 of the adjustment plate 154 or else be disposed or located within a corresponding pair of opposed adjustment apertures of the plurality of adjustment apertures 162. Disposition of the pair of adjustment protrusions 75 within a corresponding pair of opposed adjustment apertures of the plurality of adjustment apertures 162 may define a number of retention positions that may be occupied by one of the first and second clip sections 34, 38 relative to the other of the first and second clip sections 34, 38. Additionally, disposition of the pair of adjustment protrusions 75 on top of opposed portions (not labeled) of the adjustment plate extending between the adjustment apertures 162 may define a number of separate transition positions that may be occupied by one of the first and second clip sections 34, 38 relative to the other of the first and second clip sections 34, 38. As such, each of the retention positions provides a greater resistance to relative rotational motion between the first and second clip sections 34, 38 than each of the separate transition positions. Stated otherwise, disposition of the pair of adjustment protrusions 75 within the plurality of adjustment apertures 162 provides a greater resistance to relative rotational motion than when the pair of adjustment protrusions 75 is not situated or located within the plurality of adjustment apertures 162.

Figure 6B:
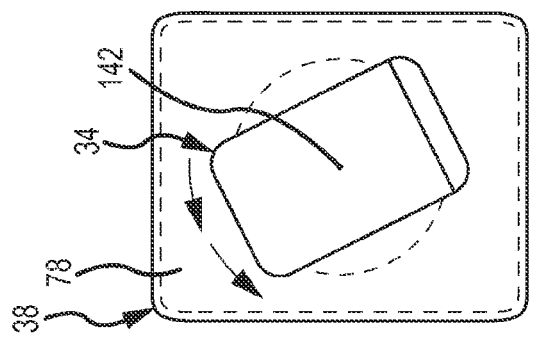
FIG. 6b is another top view of the clip of FIG. 2, showing the first clip section in a second orientation relative to the second clip section, and after the clip sections having been rotated or pivoted relative to each other.
Figure 6A:
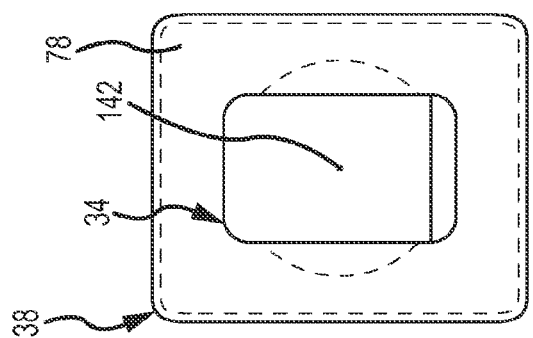
FIG. 6a is a top view of the clip of FIG. 2, showing the first clip section in a first orientation relative to the second clip section.

Based upon the foregoing, as a user rotates one of the first and second clip sections 34, 38 relative to the other of the first and second clip sections 34, 38, one of the first and second clip sections 34, 38 may be disposed in a number of discrete retention positions (e.g., eight) relative to the other of the first and second clip sections 34, 38 as the pair of adjustment protrusions 75 moves between respective pairs of adjustment apertures of the plurality of adjustment aperture 162. For example, the first clip section 34 may be rotated from a first retention position as is illustrated in FIG. 6a (not all features of the clip 22 being illustrated in FIG. 6a for clarity) to a second retention position relative to the second clip section 38 as is illustrated in FIG. 6b (not all features of the clip 22 being illustrated in FIG. 6b for clarity).

At least some portion of the clip 22 may be resilient to allow the pair of adjustment protrusions 75 to exit a corresponding pair of adjustment apertures 162. For instance, if the first member 90 of the first portion 78 of the second clip section 38 includes a pliable layer or layer of cardboard, then the adjustment plate 154 may "give" a bit and allow the pair of adjustment protrusions 75 to exit a corresponding pair of adjustment apertures 162 upon rotation of one of the first and second clip sections 34, 38 relative to the other of the first and second clip sections 34, 38. In other embodiments, each adjustment protrusion of the pair of adjustment protrusions 75 may include a spring-loaded ball bearing. In further arrangements, each adjustment protrusion of the pair of adjustment protrusions 75 may be constructed of a material that is elastically deformable. Notwithstanding the foregoing description, any appropriate way of rotatably interconnecting the first and second clip sections 34, 38 may be utilized. Moreover, any appropriate way of providing a plurality of predetermined positions of the first clip section 34 relative to the second clip section 38 may be utilized.

Figure 8:
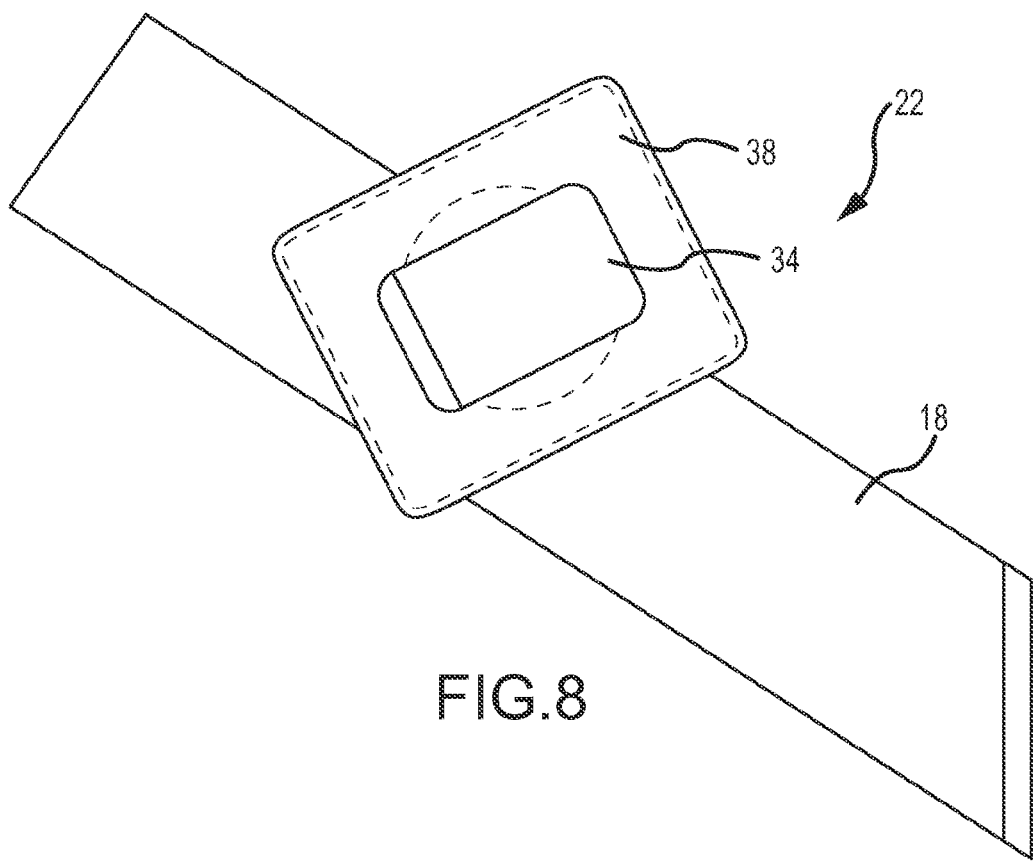
FIG. 8 is a top view of the clip of FIG. 2 being mounted onto a restraint, such as the strap of the restraint system of FIG. 1.

With reference to FIGS. 1, 4b, 5b and 8, one method of detachably mounting a bib 14 to a strap 18 will now be described. It will be appreciated that other assembly methods may be possible. Initially, the first and second clamp members 102, 106 of the second portion 82 of the second clip section 38 may be appropriately separated against a biasing force that exists between the first and second clamp members 102, 106 (e.g., the magnetic attraction of the magnetic members and interaction of the hook members 122, 134) to the loading position illustrated in FIG. 5b, and a strap 18 may be inserted into the receiving space 110. Thereafter, one of the first and second clamp members 102, 106 may be released or else pushed or pulled towards the other of the first and second clamp members 102, 106 to sandwich or compress the strap 18 between the first and second clamp members 102, 106 as illustrated in FIGS. 1 and 8 (not all features of the clip 22 being illustrated in FIGS. 1 and 8 for clarity). Thereafter, the first clip section 34 may be appropriately rotated relative to the second clip section 38 so as orient the length of the first clip section 34 in a substantially vertical orientation. In other words, the receiving space 54 may be appropriately oriented in a downward direction. In other embodiments, the second clip section 38 may be rotated or otherwise positioned to orientations other than vertical orientations. In any case, the first and second clamp portions 46, 50 of the first clip section 34 may then be appropriately separated against the biasing (e.g., spring) force of the biasing section 58 to the loading position illustrated in FIG. 4b, and the upper portion 26 of the bib 14 may be inserted into the receiving space 54 so as to engage with the first clip section 34. One of the first and second clamp portions 46, 50 of the first clip section 34 may be released or else pushed or pulled towards the other of the first and second clamp portions 46, 50 to sandwich or compress the bib 14 between the first and second clamp members 46, 50 as illustrated in FIG. 1. As previously described, the strap 18 could instead be detachably mounted within the first clip section 34 and the bib 14 could be detachably mounted within the second clip section 38.

Figure 9:
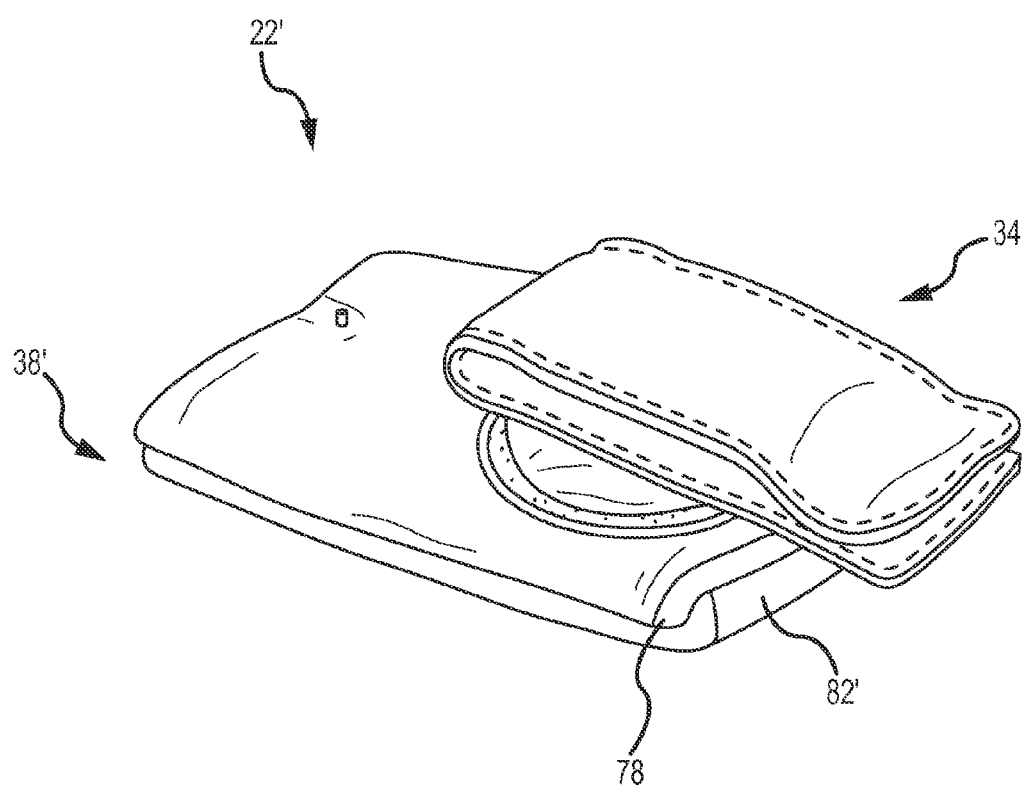
FIG. 9 is a top perspective view of another embodiment of a clip that may be used with a restraint system.
Figure 10:
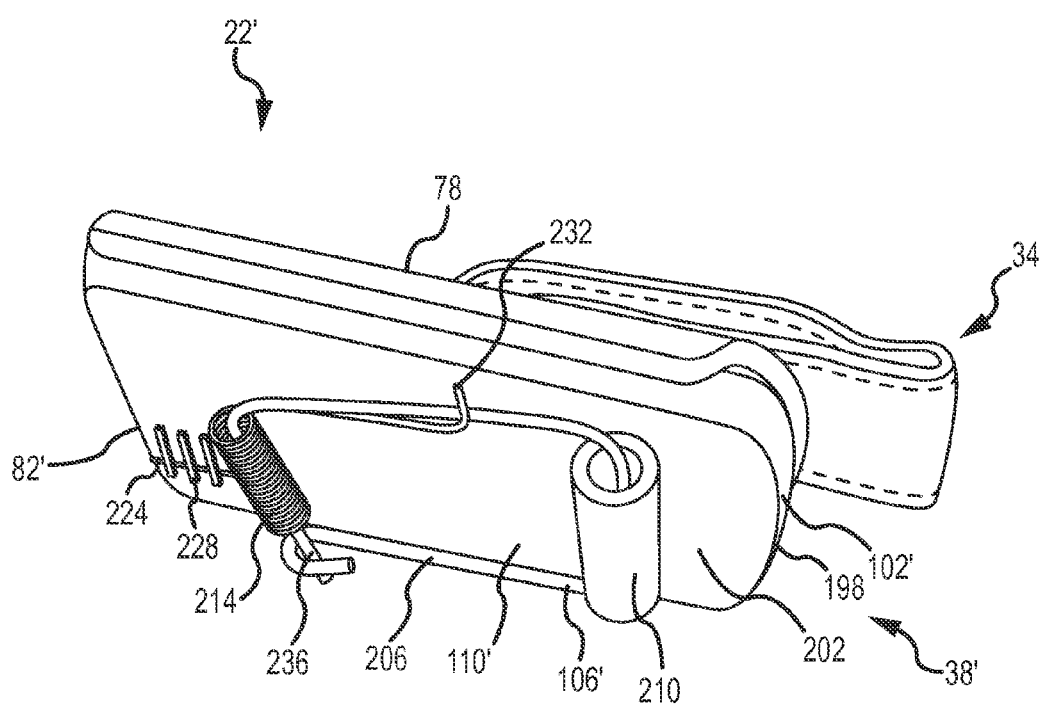
FIG. 10 is a bottom perspective view of the clip of FIG. 9.

FIGS. 9-10 present a variation of the clip or mounting clip 22 of FIGS. 1-8. Corresponding components between the two embodiments are identified by a common reference numeral. Those corresponding components that differ in at least some respect are identified by a "single prime" designation in FIGS. 9-10. Each of the first clip section 34 and the second clip section 38' again may be detachably mounted to a bib 14 or a strap 18. In this embodiment, the second portion 82' of the second clip section 38' of the clip 22' may include a first member 102', and this first member 102' may include a member 198 with a receiving surface 202. Further, the second clamp member 106' may include a trap member 206 having a roller 210 rotatably disposed thereon (the roller 210 may rotate about a portion of the trap member 206) that may be operable to compress an object (e.g., bib 14, strap 18) against the receiving surface 202 of the member 198. Further advantages of the roller 210 will be described below. A biasing member 214 (e.g., torsion spring) interconnects the first and second clamp members 102', 106' and may serve to provide a bias or compressive force between the first and second clamp members 102', 106' so as to bias the first and second clamp members 102', 106' to a strap and/or bib retaining position as illustrated in FIGS. 9-10. Stated otherwise, the biasing member 214 may tend to urge the first and second clamp members 102', 106' back toward a static position when deflected from the static position.

The biasing member 214 may include a first leg 224 that may be attached to the member 198 in any appropriate manner (e.g., staples 228), and a second leg 232 that may be appropriately removably disposed about a portion of the trap member 206. Moreover, the trap member 206 may include a pivot pin 236 that may extend through a portion of the biasing member 214 and may be pivotable relative thereto. As a result, the second leg 232 may serve to urge the trap member 206 towards the receiving surface 202 even when the first and second clamp members 102', 106' are separated from each other. A user may also disengage or otherwise remove the second leg 232 from the trap member 206 in which case the biasing member 214 may be operable to not exert a biasing force and urge the trap member 206 against the receiving surface 202.

In use and when the second leg 232 is appropriately engaged with the trap member 206, a user or operator may appropriately grasp one of the first clamp member 102' and second clamp member 106' and pull or push the other of the first clamp member 102' and second clamp member 106' against the biasing force of the biasing member 214 to separate the first and second clamp members 102', 106' into a loading position and accordingly expose receiving space 110'. Thereafter, the user may insert any appropriate device (e.g., bib 14) into the receiving space, preferably until the bib 14 is substantially adjacent to the biasing member 214. The user may then release either of the first and second clamp members 102', 106' to allow the biasing member 214 exert a compressive force between the first and second clamp members 102', 106' and allow at least a portion of the trap member 206 (e.g., roller 210) to urge the bib 14 against the receiving surface 202. At this point, the bib 14 may be considered to be releasably or detachably attached or mounted to the second clip section 38' and thus the clip 22'.

The roller 210 may advantageously facilitate loading, unloading and/or adjustment of the bib 14 or other device situated within the receiving area 110' of the second clip section 38'. For instance, if a user desires to not attempt to separate the first and second clamp members 102', 106' for loading of a bib 14, the user may simply insert an edge of the bib 14 into the space between the roller 210 and the receiving surface 202 of the member 198 and pull the bib 14 into the receiving space 110' to a desired location. The roller 210 may facilitate such loading by reducing friction between the trap member 206 and the bib 14 (e.g., by the roller 210 rotating as the bib 14 is being inserted between the first and second clamp members 102', 106'). Once the desired location is reached, the user may simply stop pulling or otherwise moving the bib 14 and the roller 210 may serve to urge the bib 14 against the receiving surface 202 and thus detachably connect or mount the bib 14 to the second clip section 38'. Thereafter, the user may enact fine adjustments of the bib 14 within the receiving area 110' by pulling or otherwise moving a portion of the bib 14 without separating the first and second clamp members 102', 106'. Additionally, a user may unload the bib 14 from the receiving area 110' by pulling the bib 14 out of the receiving area 110' again without separating the first and second clamp members 102', 106'.

As previously discussed, the clip 22 may be provided without a first portion 78. As such, the member 198 of the first clamp member 102' of the clip 22' may incorporate at least a portion of the pivot assembly 42. In further embodiments, the trap member 206 of the second clamp member 106' and biasing member 214 may be appropriately attached or mounted to the first portion 78 of the second clip section 38'.

Figure 11:
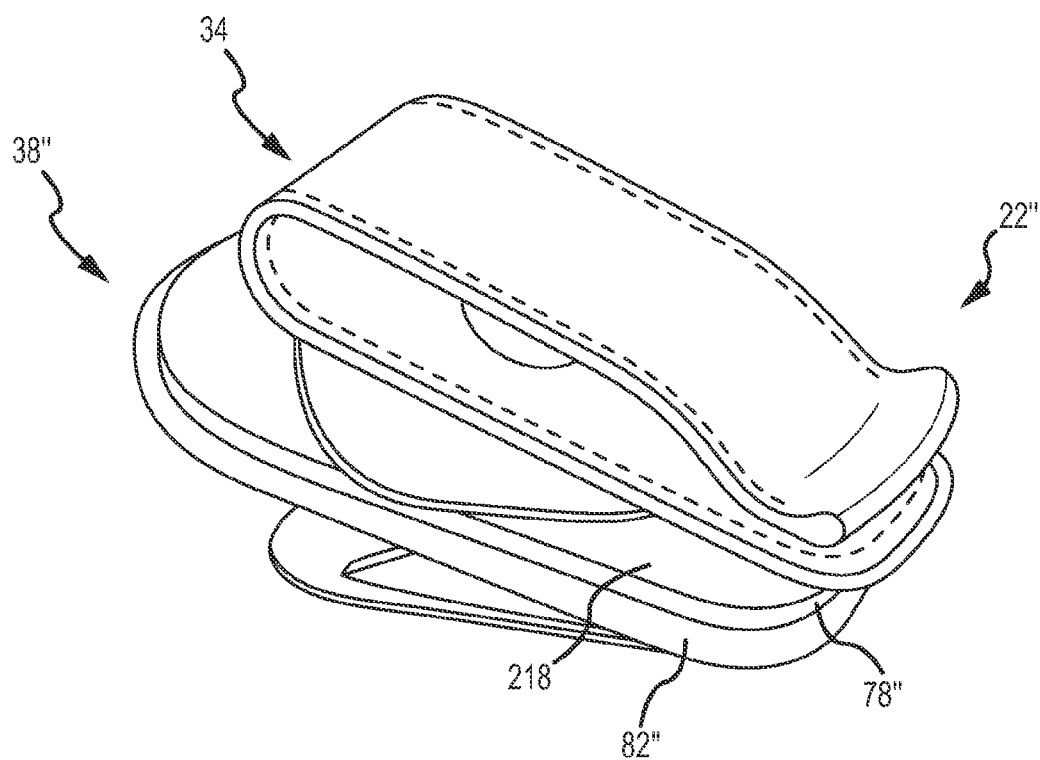
FIG. 11 is a top perspective view of another embodiment of a clip that may be used with a restraint system.
Figure 12:
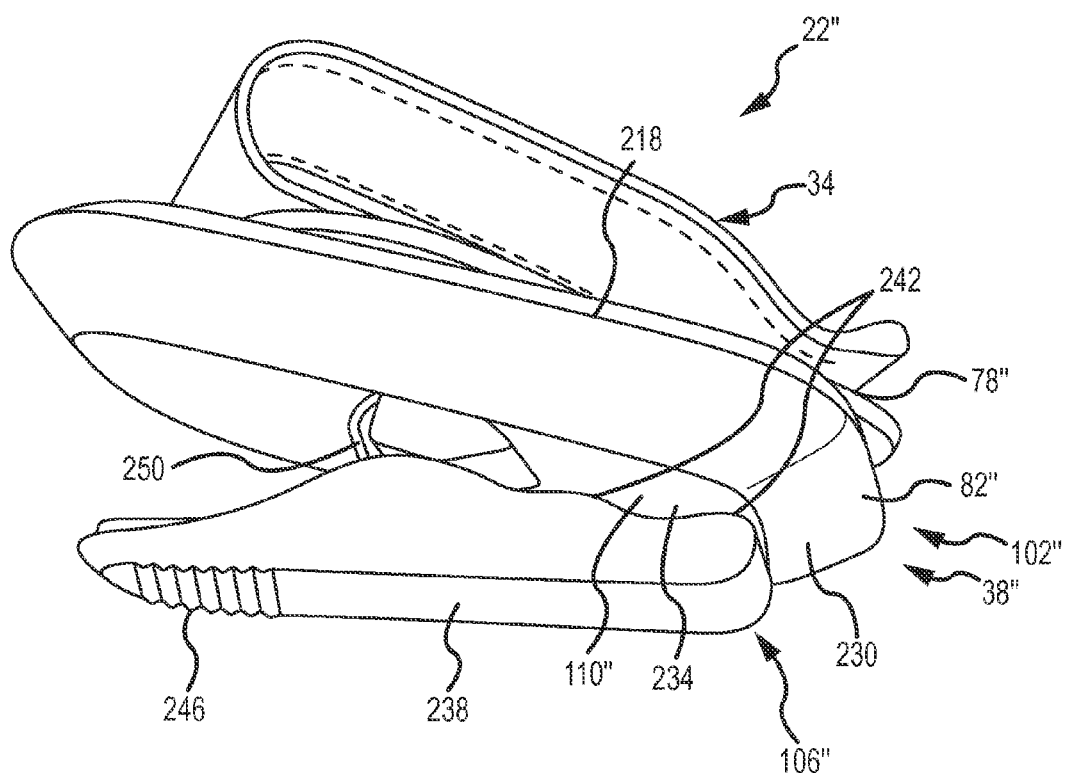
FIG. 12 is a bottom perspective view of the clip of FIG. 11.
Figure 13:
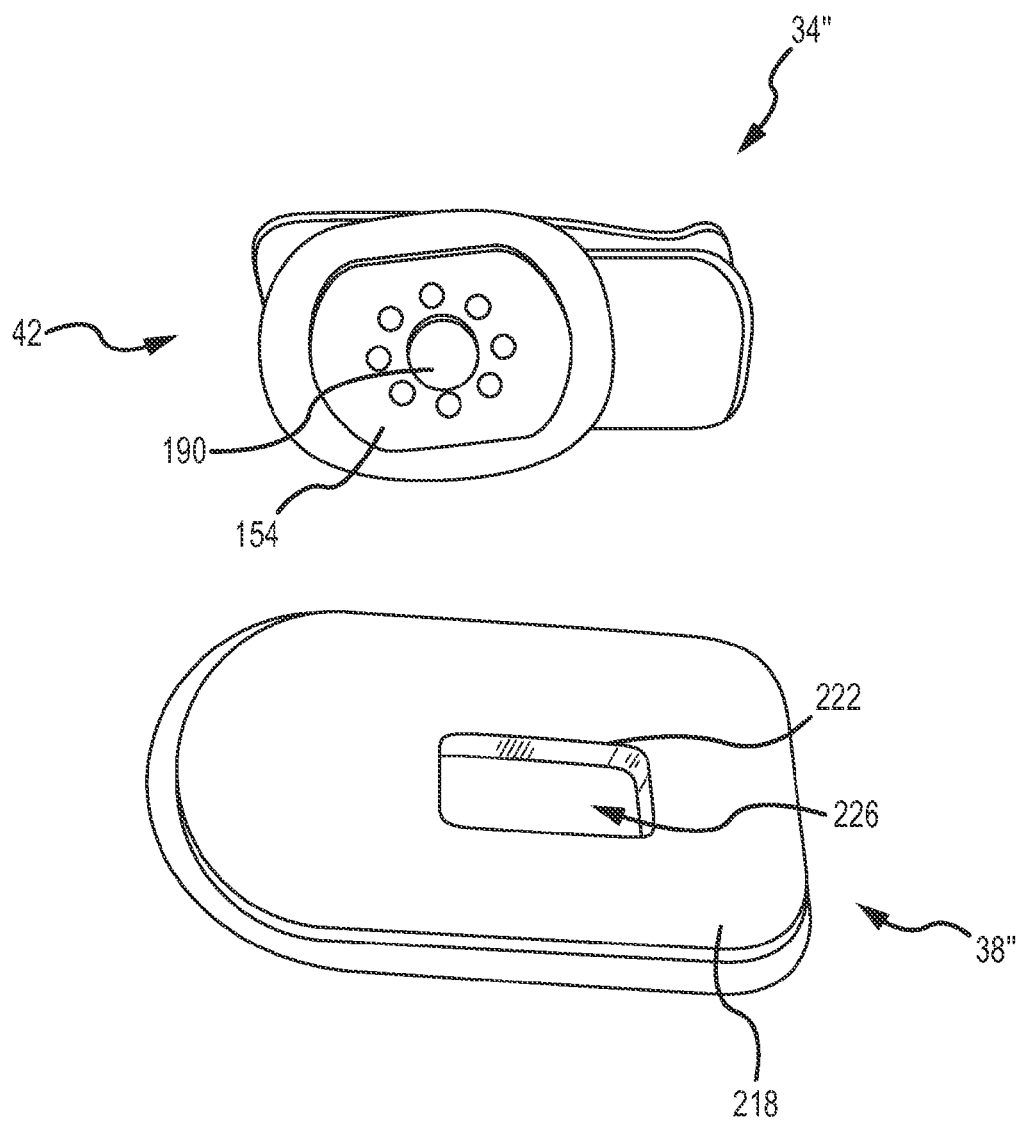
FIG. 13 is an exploded view of the clip of FIG. 11.

FIGS. 11-13 present another variation of the clip or mounting clip 22 of FIGS. 1-8. Corresponding components between the two embodiments are identified by a common reference numeral. Those corresponding components that differ in at least some respect are identified by a "double prime" designation in FIGS. 11-13. Each of the first clip section 34 and the second clip section 38" again may be detachably mounted to a bib 14 or a strap 18. In this embodiment, the first clip section 34 may be rotatably and removably attached to the second clip section 38". More specifically, the first portion 78" of the second clip section 38" may now be in the form of a magnetic plate 218 with a receiving aperture 222 leading to a receiving space 226 therein. The end portion and/or expanded portion 190 of the shaft 186 of the pivot assembly 42 may be removably located through the receiving aperture 222 and into the receiving space 226, and the adjustment plate 154 may be magnetically attracted to the magnetic plate 218. As a result, the first clip section 34 may be repeatedly detachably connected to and removed from the second clip section 38" by simply inserting the end portion and/or expanded portion 190 of the shaft 186 into the receiving space 226 and allowing the adjustment plate 154 to be magnetically attracted to the magnetic plate 218. Thus, the adjustment plate 154 may be appropriately made of a ferromagnetic material or appropriate type of metal.

Further, in this embodiment the second portion 82" of the second clip section 38" may include a first clamp member 102" that may include a platform 230 with a receiving surface 234 thereon. The second clamp member 106" may include an arm 238 that may be appropriately pivotally connected (e.g., by a ball and socket arrangement, pivot pin) to the platform 230 and may be operable to compress an object (e.g., bib 14, strap 18) against the receiving surface 234. The arm 238 may include interface portions 242 for providing a gripping contact against the bib 14 or strap 18. The interface portions 242 may be operable to contact the bib 14 or strap 18 situated within the receiving space 110" against the receiving surface 234. In this regard, the interface sections 242 may be operable to exert a greater force on the bib 14 or strap 18 than a portion (not labeled) of the arm 238 that extends between the interface sections 242. The arm 238 may also include finger grips 246 that may facilitate separation of the interface portions 242 from the receiving surface 234.

A biasing member 250 (e.g., leaf spring) interconnects the first and second clamp members 102", 106" and may serve to provide a bias or compressive force between the first and second clamp members 102", 106" so as to bias the first and second clamp members 102", 106" to a strap and/or bib retaining position as illustrated in FIG. 12. Stated otherwise, the biasing member 250 may tend to urge the first and second clamp members 102", 106" back toward a static position when deflected from the static position. A user may load an object (e.g., bib 14, strap 18) into the receiving space 110" similar to methods as previously described.

In other embodiments, the clip 22" may be provided without a first portion 78" of the second clip section 38", and at least a portion of the second portion 82" (e.g., first clamp member 102") may be constructed of a magnetic material or otherwise incorporate a magnetic member to interact with a portion of the pivot assembly 42 (e.g., adjustment plate 154). In even further embodiments, other types of devices and arrangements (e.g., mechanical) may be provided to allow the first and second clip sections 34", 38" to be removably and/or rotatably attached to each other. For instance, detent/aperture types arrangement may be provided between the first and second clip sections 34", 38" that would allow the first and second clip sections 34", 38" to be snapped into engagement with each other, and thereafter unsnapped or otherwise disengaged.

Figure 14:
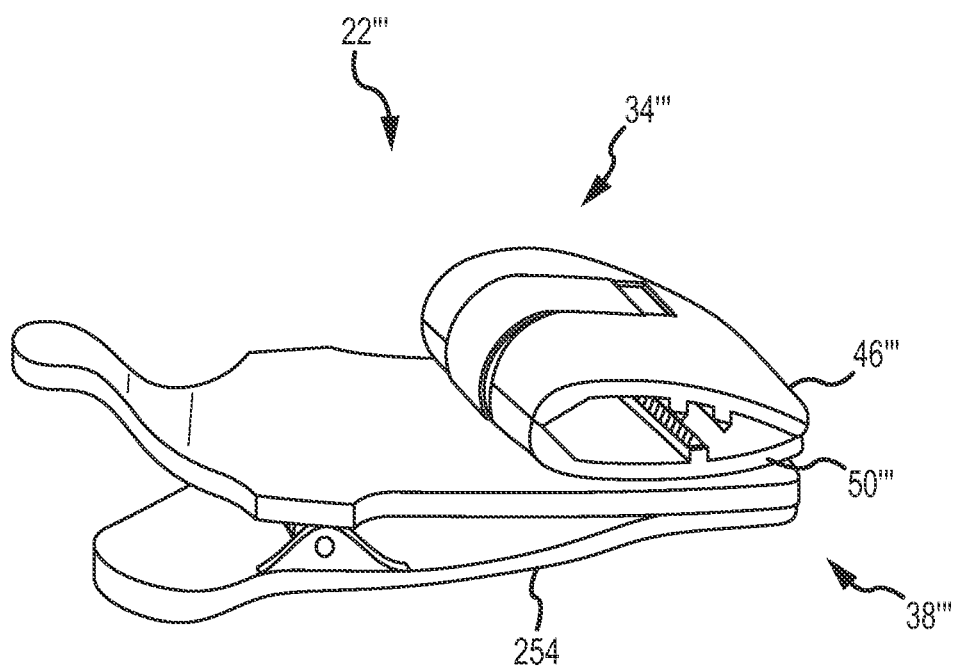
FIG. 14 is a top perspective view of another embodiment of clip that may be used with a restraint system.
Figure 15:
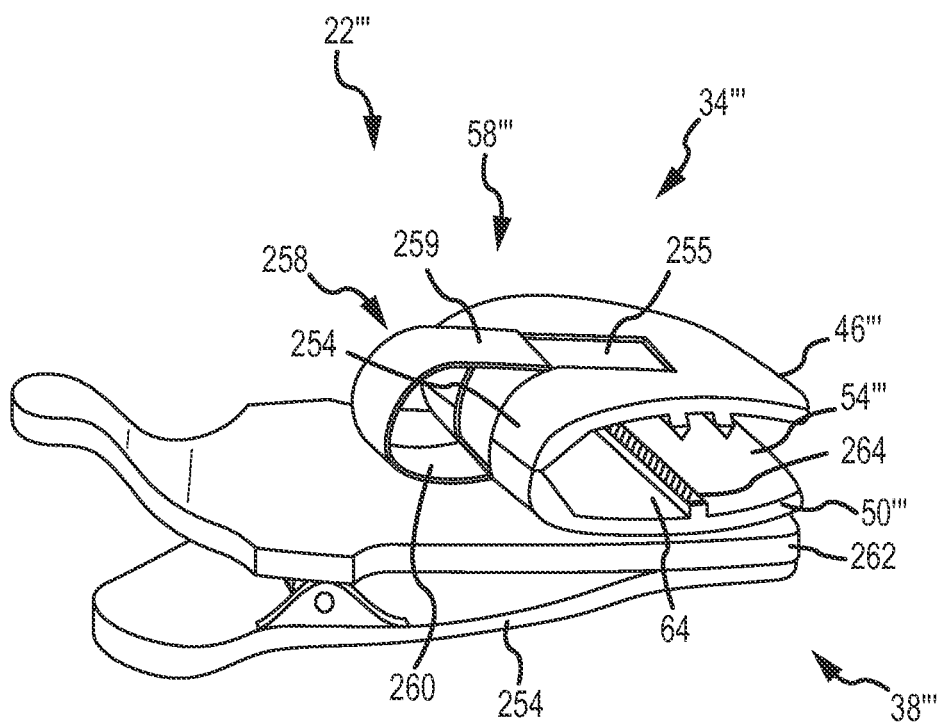
FIG. 15 is another top perspective view of the clip of FIG. 14.
Figure 16:
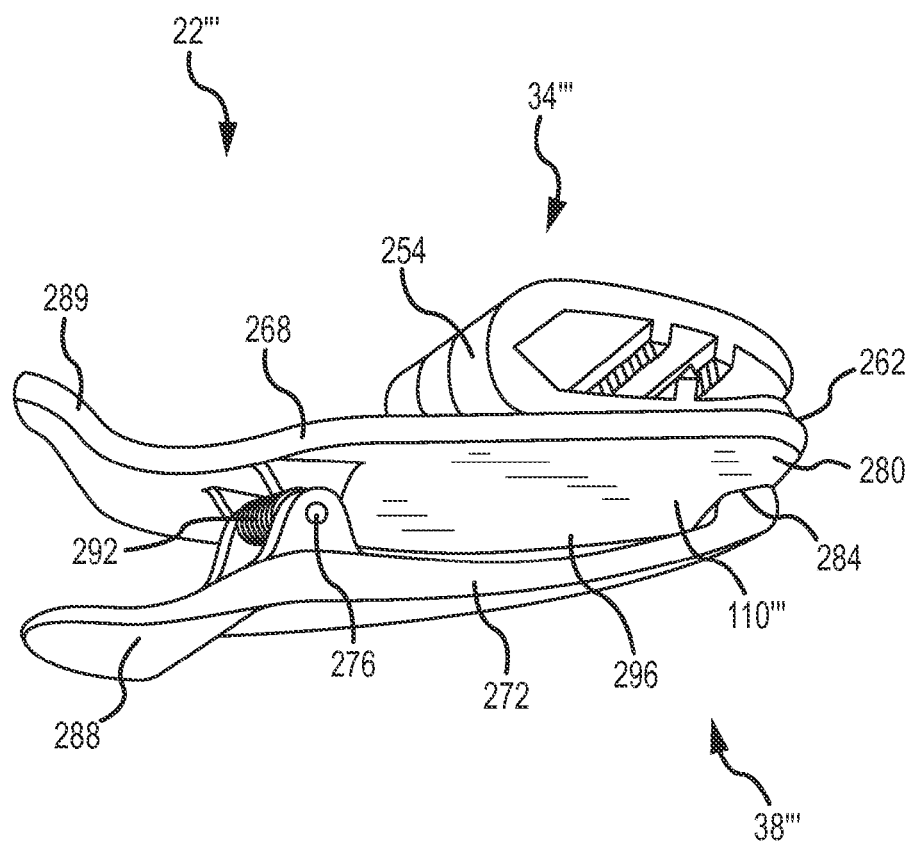
FIG. 16 is a bottom perspective view of the clip in FIG. 14.

FIGS. 14-16 present another variation of the clip or mounting clip 22 of FIGS. 1-8. Corresponding components between the two embodiments are identified by a common reference numeral. Those corresponding components that differ in at least some respect are identified by a "triple prime" designation in FIGS. 14-16. Each of the first clip section 34" and the second clip section 38" again may be detachably mounted to a bib 14 or a strap 18. In this embodiment, the first clip section 34'" may include first and second clamp portions 46", 50'" that may be movable relative to each other with a receiving space 54" formed between the first and second clamp portions 46", 50'" for accepting the strap 18, bib 14, etc. A biasing section 58" may interconnect the first and second clamp portions 46", 50'" and may serve at least two functions: a) to provide a bias force so as to bias the first and second clamp portions 46", 50'" into a strap and/or bib loading position, and b) to provide a bias or compressive force between the first and second clamp portions 46", 50'" so as to bias the first and second clamp portions 46", 50" to a strap and/or bib retaining position as illustrated in FIG. 14, as will be described below.

The biasing section 58" may include any appropriate device serving to interconnect the first and second clamp portions 46", 50'" and allow such portions to move relative to each other between at least loading and retaining positions. Such a device may also serve to provide a biasing force between the first and second clamp portions 46", 50'". For instance, the biasing section 58" may include a living hinge 254 movably connecting the first and second clamp portions 46'", 50'" that may serve to provide a biasing force that may tend to separate the first and second clamp portions 46", 50'" from each other when such portions are not subject to outside compressive forces. The first and second clamp portions 46", 50'" could also be part of a clothes-pin type structure.

The biasing section 58" may also include a clip member 258. The clip member 258 may include a first leg 259 that may be operable to slide into and out of a depression 255 situated within a portion of the first clamp portion 46" of the first clip section 34'", and a second leg 260 that may be operable to slide into and out of a depression (not shown) situated between the second clamp portion 50'" of the first clip section 34" and another portion of the first clip section 34" (e.g., platform 262). The platform 262 may be rigidly or otherwise non-movably attached to the second portion 50'" of the first clip section 34" and in this regard may be considered to be part of the first clip section 34'".

Based upon the foregoing, when a user slides the spring member 258 out of depression 255 and the other depression to the position illustrated in FIG. 15, the first and second clamp portions 46", 50'" may be biased into a strap and/or bib loading position as shown in FIG. 4b owing in part to the biasing force of the living hinge 254. A user may further appropriately manipulate the first and second clamp portions 46", 50'" by pulling or pushing such members to increase the size of the receiving space 64. Thereafter, the user may insert an object (e.g., strap 18, bib 14) into the receiving space 64. In this regard, the first and second clamp portions 46", 50'" may accommodate installation of the strap and/or bib. Thereafter, the first and second legs 259, 260 of the spring 258 may be slid back into their respective depressions (255, the other not being shown) to compress the first and second clamp portions 46", 50" towards each other and overcome the biasing force of the living hinge 254; the object is now releasably or detachably attached to the first strap section 34". Stated otherwise, the spring 258 may be operable to urge the first and second clamp portions 46", 50'" together. At least one of the first and/or second clamp portions 46", 50'" may include at least one tooth 264 or other protrusion for increasing the gripping ability of the first and/or second portions 46", 50'".

The second clip section 38" may include first and second clamp sections 268, 272 that may be pivoted relative to each other via a pivot pin 276. In this regard, the first and second clamp sections 268, 272 together may be in the form of a clamping member. The second clamp section 272 may be in the form of an arm that may be operable to compress an object (e.g., bib 14, strap 18) against a portion of the first clamp section 268 and/or a receiving surface 280 of the platform 262. The second clamp section 272 may include at least one interface portion 284 for providing a gripping contact against the bib 14 or strap 18. The interface portion 284 may be operable to urge the bib 14 or strap 18 situated within the receiving space 110'" against the receiving surface 280. The second clamp section 272 may also include a finger grip 288 which may be in the form of a handle that may facilitate separation of the at least one interface portion 284 from the receiving surface 280. Such finger grip 288 may be used in conjunction with a corresponding finger grip or handle 289 situated on a portion of the platform 262.

A biasing member 292 may be appropriately associated with the pivot pin 276 and may serve to provide a bias or compressive force between the first and second clamp sections 268, 272 so as to bias the first and second clamp sections 268, 272 to a strap and/or bib retaining position as illustrated in FIG. 16. Stated otherwise, the biasing member 292 may tend to urge the first and second clamp sections 268, 272 back toward a static position when deflected from the static position. For instance, the biasing member 292 may be in the form of a torsion spring that may be wrapped or otherwise disposed about a portion of the pivot pin 276. A user may load an object (e.g., bib 14, strap 18) into the receiving space 110'" similar to methods as previously described. An appropriate pivot assembly 296 may pivotally interconnect the first and second clip sections 34'", 38'" such that the first and second clip sections 34'", 38'" may be disposed in one of a plurality of retention positions or else can be freely disposed any desired rotational position relative to each other. The pivot assembly 296 may be similar to those as previously described or may be any other appropriate pivot device.

Figure 17A:
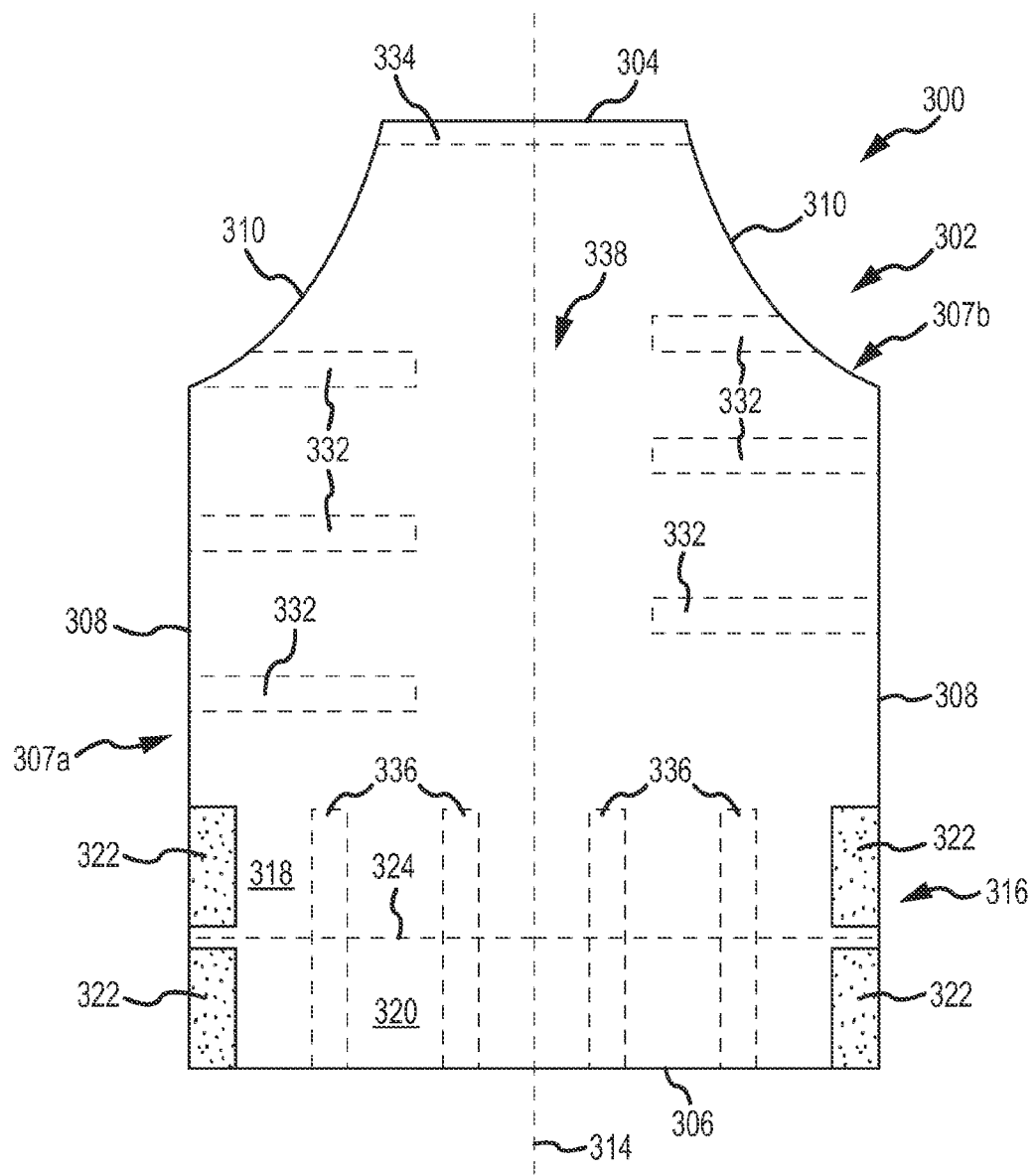
FIG. 17A is a plan view of one embodiment of a bib that may be used with the clips presented herein.
Figure 17B:
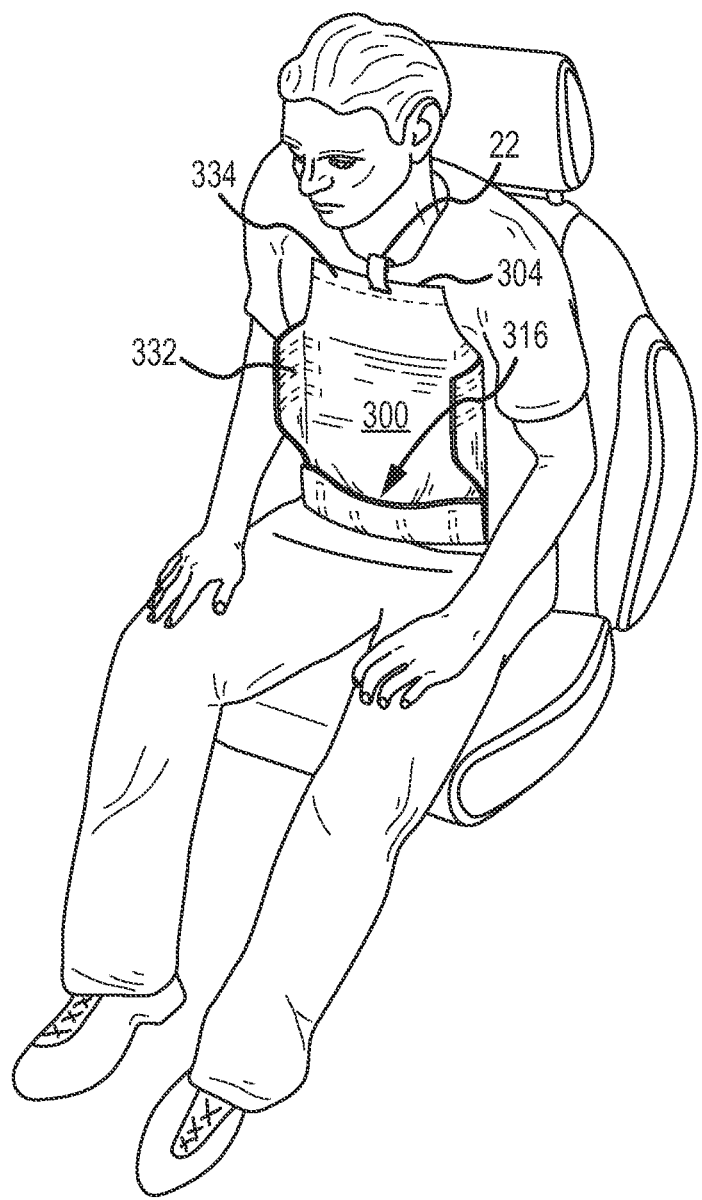
FIG. 17B is a perspective view of one application for the bib of FIG. 17A.

One embodiment of a bib that is adapted for use with any of the clips described herein is presented in FIGS. 17A and 17B and is identified by reference numeral 300. The bib 300 includes a bib body 302 that is defined by a top edge 304, a bottom edge 306, and a pair of sides 307a, 307b that extend between the top edge 304 and bottom edge 306. The top edge 304 and bottom edge 306 are spaced along a longitudinal reference axis 314 (e.g., the top edge 304 and bottom edge 306 may be characterized as being spaced in a longitudinal dimension). The two sides 307a, 307b are spaced from the longitudinal reference axis 304 (e.g., the sides 307a, 307b may be characterized as being spaced in a lateral dimension, for instance a dimension that is orthogonal to the longitudinal reference axis 314). In one embodiment, the longitudinal reference axis 314 bisects the bib body 302 such that corresponding portions of the two sides 307a, 307b are equally spaced from the longitudinal reference axis 314. The portion of the bib body 302 that is on the left side of the longitudinal reference axis 314 in the view shown in FIG. 17A may be the mirror image of the portion of the bib body 302 that is on the right side of the longitudinal reference axis 314 in the view shown in FIG. 17A.

In the illustrated embodiment, each side 307a, 307b of the bib body 302 is in the form of a side edge 308 and a transition section 310. Each of the transition sections 310 extend from their corresponding side edge 308 to the top edge 304 (e.g., to a corresponding end of the top edge 304). Each of the transition sections 310 may be characterized as being curved, concave, or arcuately-shaped (e.g., to better accommodate a movement of the user's arms, for instance to accommodate arm movement that does not substantially change the position of the bib 300 on the user and/or does not disrupt the functionality of the bib 300 to an undesired degree).

The top edge 304 of the bib body 302 includes what may be characterized as an upper or top reinforcement member 334 which may be embedded or encased within the bib body 302. Generally, the top reinforcement member 334 is of a sufficient rigidity such that the bib 300 may be suspended from the top edge 304 anywhere along the top reinforcement member 334 and yet remain in an at least substantially constant orientation. The bib 300 should "hang" in a constant orientation regardless of the location along the top reinforcement member 334 where any of the above-noted mounting clips engages the bib 300. That is, the top reinforcement member 334 facilitates engagement of the bib 300 by mounting clips of the above-noted type. The upper reinforcement member 334 may facilitate suspending the bib body 302 from a single location or region. The upper reinforcement member 334 may facilitate maintaining the bib 300 in an acceptable position on a user (e.g., including the upper reinforcement member 334 should reduce the potential that an upper portion of the bib 300 will simply fold over onto a lower portion of the bib 300 when worn by a user, including when the bib 300 is suspended from a single location or region).

The top reinforcement member 334 may extend along an entirety of the top edge 304 of the bib body 302. The reinforcement member 334 may be characterized as being bendable, flexible, pliable, or the like. A user may readily change the shape of the top reinforcement member 334, and once moved into its new shape the top reinforcement member 334, may at least substantially retains this new shape. The top reinforcement member 334 may be in the form of a pliable metal strip, a pliable metal wire, or the like.

The top edge 304 of the bib body 302 may be characterized as being of a first width, and the spacing between the pair of side edges 308 of the bib body 302 may be characterized as being of a second width. This second width (e.g., the spacing between the side edges 308) may be of a larger magnitude than the first width (e.g., the length of the top edge 304). The bib body 302 may be characterized as diverging away from the longitudinal reference axis 314 proceeding from each end of the top edge 304 to its corresponding side edge 308. Each of these two "diverging portions" of the bib body 302 may be in the form of the above-noted transition sections 310.

The bib 300 also includes a plurality of what may be characterized as body reinforcement members 332. These body reinforcement members 332 may be embedded within the bib body 302 and as will be discussed in more detail below in relation to FIG. 18. Each body reinforcement member 332 may be characterized as being bendable, flexible, pliable, or the like (e.g., in the form of a flat, metal, bendable band; in the form of a conventional pipe cleaner). A user may readily change the shape of each individual body reinforcement member 332, and once moved into its new shape each such body reinforcement member 332 may at least substantially retain this new shape. Generally, the various body reinforcement members 332 may be "bent" into a shape so as to funnel "spillage" (e.g., crumbs, liquids) into a pocket 316 that may be formed along the lower extreme of the bib 300 (e.g., FIG. 17B).

Each of the body reinforcement members 332 may extend from either the left side 307*a* of the bib body 302 or the right side 307*b* of the bib body 302. Each body reinforcement member 332 may be characterized as extending from a corresponding side 307*a*, 307*b* of the bib body 302 and in the direction of the longitudinal reference axis 314. A first group of body reinforcement members 332 may extend from the left side 307*a* of the bib body 302, while a second group of body reinforcement members 332 may extend from the right side 307*b* of the bib body 302. Any appropriate number of body reinforcement members 332 may extend from the left side 307*a* of the bib body 302. Similarly, any appropriate number of body reinforcement members 332 may extend from the right side 307*b* of the bib body 302. Typically, at least two body reinforcement members 332 will extend from each of the two sides 307*a*, 307*b* of the bib body 302. One or more body reinforcement members 332 may extend from a given side edge 308, an edge of a given transition section 310, or both.

The body reinforcement members 332 that extend from the left side 307*a* of the bib body 302 may be staggered in the longitudinal dimension compared to the body reinforcement members 332 that extend from the right side 307*b* of the bib body 302. Each body reinforcement member 332 that extends from one of the sides 307*a*, 307*b* of the bib body 302 may be non-collinear with each body reinforcement member 332 that extends from the other of these sides 307*a*, 307*b*. This may facilitate folding (e.g., along the longitudinal reference axis 314, and then one or more times along a fold line that is perpendicular to the longitudinal reference axis 314) of the bib 300 for storage.

The plurality of body reinforcement members 332 may be disposed in parallel relation to each other (e.g., in relation to their corresponding length dimension, which is the left-to-right dimension for the members 332 in the view shown in FIG. 17A). The length dimension of each of the body reinforcement members 332 may be the largest dimension of each particular body reinforcement member 332. In one embodiment, each body reinforcement member 332 is in the form of an elongate band or the like (e.g., a thin metal band (e.g., rectangular in plan view)).

In the illustrated embodiment, none of the body reinforcement members 332 extend all the way to the centrally disposed longitudinal reference axis 314. That is, the bib body 302 may be characterized as having a zone 338 that is located between the two sides 307*a*, 307*b* of the bib body 302. None of the body reinforcement members 332 extend into the zone 338 in the illustrated embodiment. This zone 338 may be centrally disposed between the two sides 307*a*, 307*b* of the bib body 302.

Figure 18:
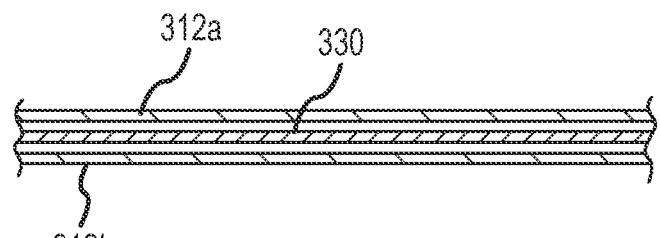
FIG. 18 is a cross-sectional view of part of the bib of FIG. 17A that includes a reinforcement member.

As noted, both the top reinforcement member 334 and each of the body reinforcement members 332 may be embedded or encased within the bib body 302. Referring now to FIG. 18, one way for forming the bib body 302 is shown—utilizing a top sheet 312*a* and a bottom sheet 312*b* that may be secured to one another in any appropriate manner (e.g., heat sealing, adhesives), for instance about its perimeter. A reinforcement member 330 is shown being located between the top sheet 312*a* and the bottom sheet 312*b* in FIG. 18. This reinforcement member 330 may be in the form of the top reinforcement member 334 and the body reinforcement members 332 discussed above, as well as the pocket reinforcement members 336 that will be addressed below.

The sheets 312*a*, 312*b* that may define at least part of the bib body 302, may be formed from any appropriate material (e.g., a thin plastic or plastic-like material, such as the type of material typically used to form the bags provided for hotel guests (e.g., for laundry)). The sheets 312*a*, 312*b* are furthermore preferably pliable such that the bib 300 may be folded up into a compact configuration for storage, as well as to be able to "drape" over the upper torso of a user in a desired manner. The exterior of at least the side of the bib 300 that interfaces with the user is preferably water repellant and/or resistant. The entire exterior of the bib 300 could be of a water replant and/or water resistant configuration. The bib 300 could also include one or more layers of materials that each provides any desired function (e.g., the bib 300 could include at least one water or liquid-absorbing layer).

The bib 300 may include at least one pocket 316. In the illustrated embodiment, a single pocket 316 is provided for or at the lower portion or section of the bib 300. This pocket 316 may be defined by folding a front pocket panel 320 of the bib body 302 back onto a back pocket panel 318 of the bib body 302. This "folded over" portion may be secured in any appropriate manner. In one embodiment, connectors 322 are provided at the side sections 308 to allow the ends of the pocket 316 to be at least substantially closed (e.g., by securing a connector 322 on the front pocket panel 322 to a corresponding connector 322 on the back pocket panel 318, where these corresponding connectors 322 may be located at or at least generally adjacent to the corresponding side 307*a*, 307*b*). The connectors 322 may be of any appropriate configuration (e.g., hook and loop connectors, such as Velcro®). Engaging corresponding connectors 322 may facilitate defining the pocket 316. The corresponding connectors 322 may be appropriately disengaged, for instance when folding up the bib body 302 for storage.

Figure 19:
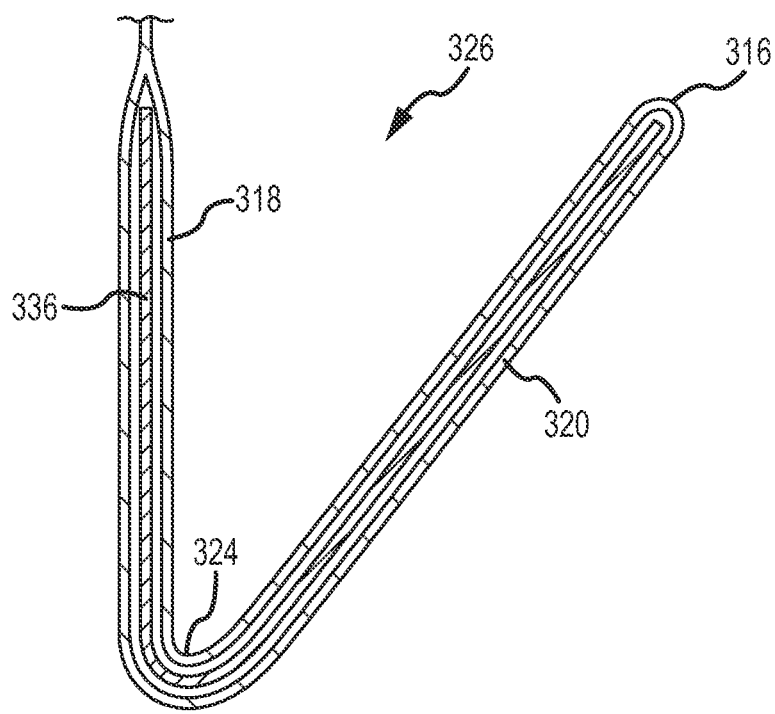
FIG. 19 is a side view of a pocket that is incorporated by the bib of FIG. 17A.

The pocket 316 may be at least generally V-shaped in a cross-sectional view, such as shown in FIG. 19, and may include a pocket opening 326. A pocket bottom 324 may be defined by the intersection between the front pocket panel 320 and the back pocket panel 318. A reinforcement member (e.g., a wire or the like; not shown) could be included at and/or facilitate defining the pocket bottom 324. Such a reinforcement member could extend along the entire length of the pocket 316, extending from one side 307a to the opposite side 307b.

The pocket 316 may include a plurality of pocket reinforcement members 336. These pocket reinforcement members 336 may be embedded or encased within the bib body 302 (e.g., FIGS. 18 and 19). Each pocket reinforcement member 336 may be characterized as being bendable, flexible, pliable, or the like. A user may readily change the shape of each individual pocket reinforcement member 336, and once moved into its new shape each such pocket reinforcement member 336 may at least substantially retain this new shape. The pocket reinforcement members 336 facilitate retaining the pocket 316 in an open configuration during use of the bib 300.

Each pocket reinforcement member 336 may extend along at least part of each of the front pocket panel 320 and the back pocket panel 318 (all or a portion of each panel 318, 320). The various pocket reinforcement members 336 may be bent into an at least generally V-shaped configuration to facilitate definition of an "open" pocket 316. The bend in each such pocket reinforcement member 336 may define the bottom 324 of the pocket 316.

The plurality of body reinforcement members 332 may be characterized as being disposed in a common first orientation (e.g., having a length dimension that is orthogonal to the longitudinal reference axis 314), while the plurality of pocket reinforcement members 336 may be characterized as being disposed in a common second orientation that is different from the first orientation (e.g., having a length dimension that is parallel to or collinear with the longitudinal reference axis 314).

As noted, the bib 300 may be used in conjunction with any of the mounting clips described herein. Regardless of which mounting clip is used, one of its mounting sections may engage the bib 300 somewhere along its top edge 304—engaging a continuous segment of the top reinforcement member 334. The bib 300 will be suspended from a single discrete location or region using the types of mounting clips described herein. Stated another way, there may be a single mechanical purchase between the types of mounting clips described herein and the bib 300 (e.g., the single mechanical purchase between the mounting clip 22 and the bib 300 being provided by the bib 300 being "clamped" between magnetically attracted clamp members 102, 106 of the mounting clip 22, whether or not such clamp members 102, 106 also use any hook and loop fastening arrangement). Contrast this with having a chain or the like with clips on the two ends of the chain, and wrapping this chain around a user's neck and having the clips engage the bib 300 at two discrete, spaced locations (where engaged by the two clips) to suspend the bib 300 from the chain and the user's neck (and which would provide a mechanical purchase at two different locations on the bib 300).

It should be appreciated that the bib 300 may be of any appropriate size. The bib 300 could extend so as to terminate at about the user's waist with the pocket 316 being formed (e.g., the pocket bottom 324 could at least generally coincide with the user's waist). Another option would be for the bib 300 to be longer such that when the user was seated, the bib 300 would also extend over the top of part of the user's legs or covers at least part of the user's lap. Although the body reinforcement members 330 located on the lap of the user could be "turned up" to create a funnel effect, they could also be "turned down" to facilitate retention of the bib 300 on the user's lap.

Figure 20:
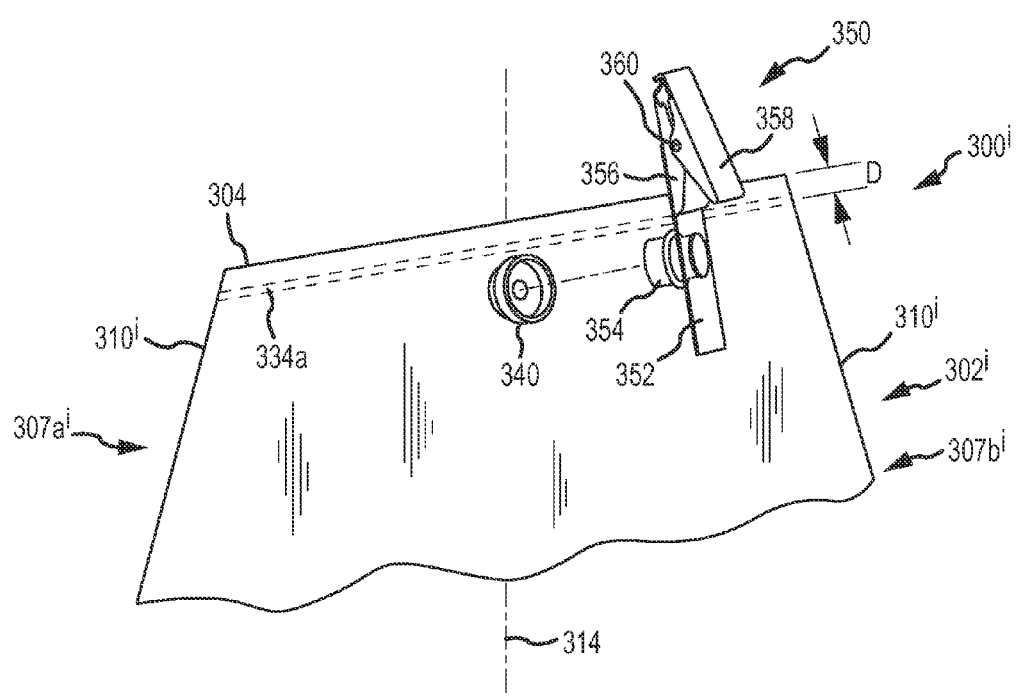
FIG. 20 is a perspective view of one embodiment of a bib, where a bib body and mounting clip each include one type of connector for providing a detachable connection between the bib body and mounting clip.

Another embodiment of a bib is presented in FIG. 20 and is identified by reference numeral $300^i$. The bib $300^i$ incorporates a mounting clip 350 to allow the bib $300^i$ to be mounted to an appropriate article (e.g., a seatbelt or shoulder strap of a restraint system; a shirt or other piece of clothing; a chain). This mounting clip 350 suspends a bib body $302^i$ of the bib $300^i$ from a single location or region at or in proximity to its upper or top edge 304. This is facilitated by the inclusion of the upper reinforcement member 334a. The upper reinforcement member 334a may be of a sufficient rigidity so that the upper portion of the bib body $302^i$ simply does not "flop down" onto another portion of the bib body $302^i$ when the bib body $302^i$ is being suspended from a single location or region by the mounting clip 350.

The bib $300^i$ of the embodiment of FIG. 20 may be characterized as incorporating the mounting clip 350. For instance, the mounting clip 350 may be mounted to the bib body $302^i$ prior to mounting the bib $300^i$ to an appropriate article. That is, the mounting clip 350 and the bib body $302^i$ may be collectively moved into position such that the mounting clip 350 may engage the desired article to suspend the bib body $302^i$ from a single location or region via the mounting clip 350.

The bib $300^i$ of the embodiment of FIG. 20 utilizes a variation of the bib body 302 discussed above in relation to the embodiment of FIGS. 17A and 17B. Corresponding components between the bib body 302 in FIG. 17A and the bib body $302^i$ depicted in FIG. 20 are identified by the same reference numeral. Those corresponding components that differ in some respect are identified by a superscripted "i" notation in FIG. 20. Unless otherwise noted, the features of the bib body 302 discussed above in relation to FIGS. 17A and 17B are equally applicable to the bib body $302^i$ shown in FIG. 20. Moreover, the bib body 302 could also be adapted to accommodate the mounting clip 350 in the manner addressed herein.

There are a number of differences between the bib body 302 shown in FIGS. 17A and 17B and the bib body $302^i$ shown in FIG. 20. The transition sections $310^i$ on the sides $307a^i$, $307b^i$ of the bib body $302^i$ are linearly extending (versus curved arcuate as in the case of the embodiment of FIGS. 17A and 17B). The bib body $302^i$ shown in FIG. 20 also has its upper reinforcement member 334a spaced from the top edge 304 of the bib body $302^i$. In one embodiment, this spacing "D" is no more than about 1.25". Having this upper reinforcement member 334a be positioned close to the top edge 304, as well as having the upper reinforcement member 334a being of a sufficient rigidity, allows the bib $300^i$ to be suspended from a single location or region (where the mounting clip 350 is anchored to the bib body $302^i$) and yet still provide desired spill coverage for a user of the bib $300^i$ (e.g., the upper section of the bib body $302^i$ should not simply "flop over" when being worn by a user in view of having the bib body $302^i$ incorporate the upper reinforcement member 334a).

The upper reinforcement member 334a again has the characteristics of the upper reinforcement member 334 set forth above. The upper reinforcement member 334a may be characterized as being bendable into a predetermined shape. This predetermined shape may be at least substantially retained without continued application of any external force to the upper reinforcement member 334a, and may allow the user to shape the upper portion of the bib body 302$^i$ into a desired configuration (e.g., to provide/retain a bib coverage area on a user). The upper reinforcement member 334a may facilitate having the bib body 302 be suspended from the mounting clip 350 at a single location or region.

The bib body 302$^i$ includes a female snap member 340 (or any other appropriate connector) that is appropriately anchored or mounted to the bib body 302$^i$. Multiple female snap members 340 could be provided (not shown) for the bib body 302$^i$. In the illustrated embodiment, the female snap member 340 is disposed on the longitudinal reference axis 314, and is spaced from both the top edge 304 and the upper reinforcement member 334a in the direction of the bottom edge 306 (see FIG. 17A) of the bib body 302$^i$.

Other locations for the female snap member 340 may be appropriate (e.g. the female snap member 340 could be located between the upper reinforcement member 334a and the top edge 304 of the bib body 302$^i$.

The mounting clip 350 used by the bib 300$^i$ includes a support 352 (e.g., a flexible plastic tab). A male snap member 354 is mounted or attached to this support 352 in any appropriate manner (e.g., a press-fit). Any appropriate way of integrating the male snap member 354 (or any other appropriate connector) with the mounting clip 350 may be utilized.

A first clamping member 356 is appropriately mounted or attached to this support 352 in any appropriate manner (e.g., bonded) in the illustrated embodiment. The first clamping member 356 and the support 352 could also be part of a common structure. In any case, a second clamping member 358 is movably interconnected with the first clamping member 356. In the illustrated embodiment, a pivot pin 360 pivotally connects the first clamping member 356 and the second clamping member 358. The first clamping member 356 and the second clamping member 358 are movable relative to each other between an open position (e.g., to allow an article to be positioned between engaging portions of the first clamping member 356 and the second clamping member 358; by a movement of the engaging portion of the second clamping member 358 at least generally away from the engaging portion of the first clamping member 356) and a closed position (e.g., to allow the first and second clamping members 356, 358 to "clamp" an article therebetween such that the bib body 302$^i$ is then suspended from this article; by a movement of the engaging portion of the second clamping member 358 at least generally toward the engaging portion of the first clamping member 356; the closed position being shown in FIG. 20). As such, the first clamping member 356 and the second clamping member 358 at least generally use a clothespin-like configuration. The mounting clip 350 may be biased to the closed position (e.g., by a spring that biases the engaging portion of the second clamping member 358 toward and into contact with the engaging portion of the first clamping member 356 when no article is disposed therebetween).

The male snap member 354 of the mounting clip 350 may be snapped into the female snap member 340 on the bib body 302$^i$ to detachably connect the mounting clip 350 with the bib body 302$^i$ in a manner such that the first clamping member 356 and second clamping member 358 are available for clamping onto an article from which the bib body 302$^i$ is to be suspended. In the installed configuration, the mounting clip 350 is able to rotate relative to the bib body 302$^i$ (e.g., the male snap member 354 may rotate within the female snap member 340)—the entire mounting clip 350 is able to move relative to the bib body 302$^i$ in at least one dimension (via the noted rotational motion).

Figure 21:
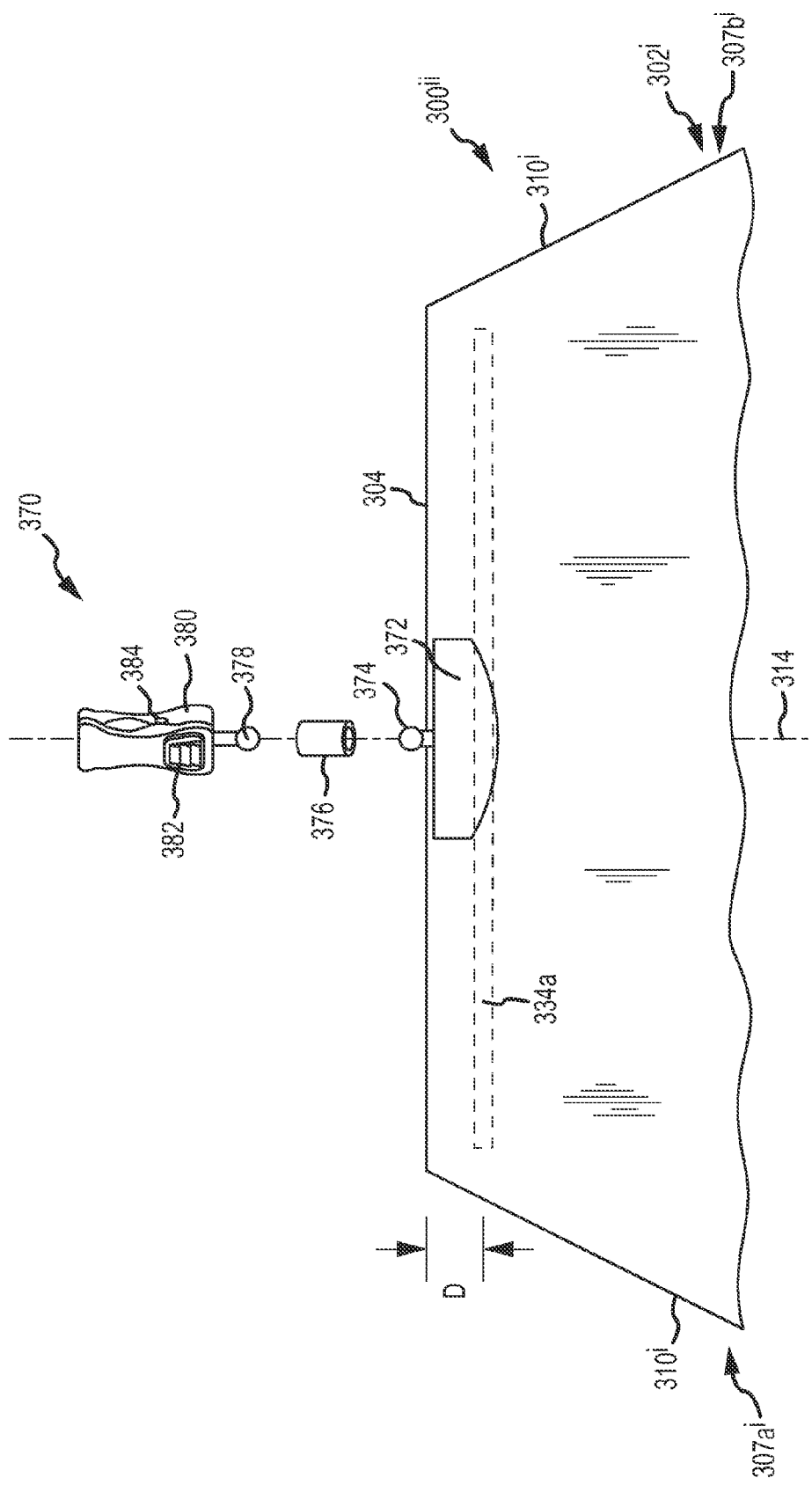
FIG. 21 is a perspective view of another embodiment of a bib, where a connection between the bib body and mounting clip allows for multi-dimensional motion between these two components.

A variation of the bib 300$^i$ (FIG. 20) is presented in FIG. 21 and is identified by reference numeral 300$^{ii}$. Generally, the bib 300$^{ii}$ uses a mounting clip 370 that is different from the mounting clip 350 shown in relation to the embodiment of FIG. 20. Although the bib 300$^{ii}$ of FIG. 21 uses the same bib body 302$^i$ discussed above in relation to the embodiment of FIG. 20, the bib body 302 of FIG. 17A could also incorporate the mounting clip 370 shown in relation to the embodiment of FIG. 21. Generally, the mounting clip 370 suspends a bib body 302$^i$ of the bib 300$^{ii}$ from a single location or region at or in proximity to its upper or top edge 304. This is facilitated by the inclusion of the upper reinforcement member 334a. As the bib 300$^{ii}$ incorporates the mounting clip 370, the mounting clip 370 is mounted to the bib body 302$^i$ prior to mounting the bib 300$^{ii}$ to an appropriate article. That is, the mounting clip 370 and the bib body 302$^i$ are collectively moved into position such that the mounting clip 370 may engage the desired article to suspend the bib body 302$^i$ from a single location via the mounting clip 370.

The mounting clip 370 for the bib 300$^{ii}$ of FIG. 21 is not removable from the bib body 302 in the illustrated embodiment (e.g., no detachable connection). Moreover, the mounting clip 370 accommodates movement in multiple dimensions relative to the bib body 302$^i$. The mounting clip 370 includes a support 372 (e.g., a thin piece of plastic) that is mounted or attached to the bib body 302$^i$ in any appropriate manner (e.g., bonding). A first ball member 374 is fixed to and extends from the support 372. The first ball member 374 is seated within a socket member 376 (e.g., within a first socket) to create a first ball and socket joint. A second ball member 378 is also seated within a different area of the socket member 376 (e.g., within a second socket) to create a second ball and socket joint. A first clamping member 380 is interconnected with the second ball member 378 in any appropriate manner. The first clamping member 380 could be integrally formed with the second ball member 378.

A second clamping member 382 is movably interconnected with the first clamping member 380. In the illustrated embodiment, a pivot pin 384 pivotally connects the first clamping member 380 and the second clamping member 382. The first clamping member 380 and the second clamping member 382 are movable relative to each other between an open position (e.g., to allow an article to be positioned between engaging portions of the first clamping member 380 and the second clamping member 382; by a movement of the engaging portion of the second clamping member 382 at least generally away from the engaging portion of the first clamping member 380) and a closed position (e.g., to allow the first and second clamping members 380, 382 to "clamp" an article therebetween such that the bib body 302$^i$ is then suspended from this article; by a movement of the engaging portion of the second clamping member 382 at least generally toward the engaging portion of the first clamping member 380; the closed position being shown in FIG. 21). As such, the first clamping member 380 and the second clamping member 382 at least generally use a clothespin-like configuration (e.g., the first clamping member 380 and second clamping member 382 may be of the same general configuration as the first clamping member 356 and second clamping member 358 shown in FIG. 20). The mounting clip 370 may be biased to the closed position (e.g., by a spring that biases the engaging portion of the second clamping member 382 toward and into contact with the engaging portion of the first clamping member 380).

The socket member 376 may be moved relative to the first ball member 374 via the first ball and socket joint, the second ball member 378 (and collectively the first clamping member 380 and second clamping member 382) may be moved relative to the socket member 376, or both, to allow the clamping members 380, 382 to collectively move relative to the bib body 302$^i$. This provides multiple dimensions of relative motion between the bib body 302$^i$ and collectively the first clamping member 380/second clamping member 382.

Figure 22A:
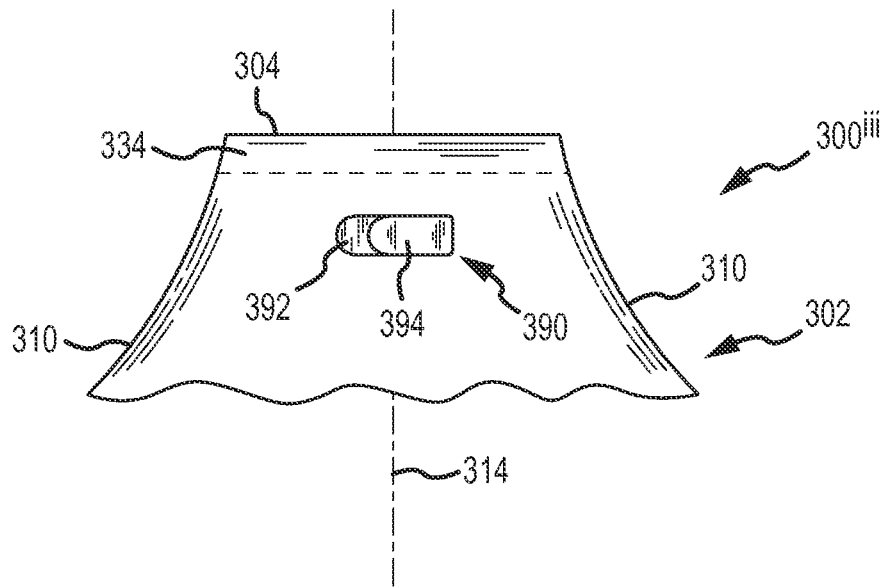
FIG. 22A is a plan view of the back of another embodiment of a bib having a bib body that incorporates a mounting clip.
Figure 22B:
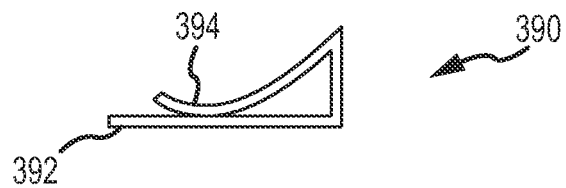
FIG. 22B is a side view of the mounting clip used by the bib of FIG. 22A.

A variation of the bib 300 of FIGS. 17A and 17B is presented in FIGS. 22A-B and is identified by reference numeral 300$^{iii}$. Generally, the bib 300$^{iii}$ incorporates a mounting clip 390. Although the bib 300$^{iii}$ of FIGS. 22A-B uses the same bib body 302 discussed above in relation to the embodiment of FIGS. 17A and 17B, the bib body 302$^i$ shown in FIGS. 20 and 21 could also incorporate the mounting clip 390 shown in relation to the embodiment of FIGS. 22A-B. Generally, the mounting clip 390 suspends the bib body 302 of the bib 300$^{iii}$ from a single location or region at or in proximity to its upper or top edge 304. This is facilitated by the inclusion of the upper reinforcement member 334a. As the bib 300$^{iii}$ incorporates the mounting clip 390, the mounting clip 390 is mounted to the bib body 302 prior to mounting the bib 300$^{iii}$ to an appropriate article. That is, the mounting clip 390 and the bib body 302 are collectively moved into position such that the mounting clip 390 may engage the desired article to suspend the bib body 302 from a single location via the mounting clip 390.

The mounting clip 390 includes a first clamping member 392 and a second clamping member 394 that are integrally formed (e.g., of one-piece construction). The first clamping member 392 is mounted or attached to the bib body 302 in any appropriate manner (e.g., bonded). In one embodiment, the first clamping member 392 does not move relative to the bib body 302. The second clamping member 394 is movably interconnected with the first clamping member 392. In the illustrated embodiment, the second clamping member 394 is movable relative to the first clamping member 392 by flexing of the second clamping member 394 and/or a joint associated with the second clamping member 394.

The first clamping member 392 and the second clamping member 394 are movable relative to each other between an open position (e.g., to allow an article to be positioned between engaging portions of the first clamping member 392 and the second clamping member 394; by a movement of the engaging portion of the second clamping member 394 at least generally away from the engaging portion of the first clamping member 392) and a closed position (e.g., to allow the first and second clamping member 392, 394 to "clamp" an article therebetween such that the bib body 302 is then suspended from this article; by a movement of the engaging portion of the second clamping member 394 at least generally toward the engaging portion of the first clamping member 392; the closed position being shown in FIG. 22B). The mounting clip 390 may be biased to the closed position (e.g., by internal spring forces that bias the engaging portion of the second clamping member 394 toward and into contact with the engaging portion of the first clamping member 392).

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A bib assembly, comprising:
   a bib comprising:
      a bib body comprising a top edge, a bottom edge, and a pair of sides, wherein a longitudinal reference axis extends between said top and bottom edges, wherein one side of said pair of sides is on one side of and is spaced from said longitudinal reference axis and the other side of said pair of sides is on an opposite side of and is spaced from said longitudinal reference axis, wherein said bib body comprises a first snap connector that is proximate to said top edge, wherein said bib body comprises a pocket, wherein said pocket comprises a plurality of pocket reinforcement members, wherein said pocket comprises a back pocket panel and a front pocket panel, and wherein each of said plurality of pocket reinforcement members extends along at least part of each of said back pocket panel and said front pocket panel; and
      an elongated upper reinforcement member incorporated by said bib body, disposed within 1.25" of said top edge of said bib body, and having a length dimension that extends in a lateral dimension; and
   a mounting clip comprising:
      a first section comprising a second snap connector and a first clamping member that are spaced from one another; and
      a second clamping member that is movably interconnected with said first clamping member;
   wherein said second snap connector of said mounting clip is detachably connectable with said first snap connector of said bib body;
   wherein said first and second clamping members are collectively rotatable relative to said bib body when said second snap connector of said mounting clip is detachably connected with said first snap connector of said bib body;
   wherein said second clamping member is movable relative to said first clamping member to define open and closed positions for said mounting clip;
   wherein said mounting clip is the only structure of said bib assembly that is included to suspend said bib from an article; and
   wherein said bib is suspended from only a single location of the article when said mounting clip is in said closed position and with said first and second clamping members detachably engaging the article, and wherein said bib is suspended from only a single location at said first snap connector.

2. The bib assembly of claim 1, wherein each said side comprises a side edge and a transition section, wherein each said transition section extends between a corresponding end of said top edge and its corresponding said side edge, and wherein each said transition section diverges away from said longitudinal reference axis proceeding from its corresponding said end of said top edge toward its corresponding said side edge.

3. The bib assembly of claim 1, wherein said elongated upper reinforcement member extends from one said side of said bib body to the other said side of said bib body.

4. The bib assembly of claim 1, wherein said elongated upper reinforcement member is bendable into a predetermined shape, and wherein said elongated upper reinforcement member at least substantially retains said predetermined shape.

5. The bib assembly of claim 1, wherein said bib body comprises first and second sheets, and wherein said elongated upper reinforcement member is encased between said first and second sheets.

6. The bib assembly of claim 1, further comprising:
a plurality of flexible body reinforcement members incorporated by said bib body and that each extend inwardly toward said longitudinal reference axis.

7. The bib assembly of claim 6, wherein each said body reinforcement member that extends from one said side of said bib body is non-collinear with each said body reinforcement member that extends from the other said side of said bib body.

8. The bib assembly of claim 6, wherein said longitudinal reference axis is located equidistantly from each of said sides, and wherein none of said plurality of body reinforcement members extends to said longitudinal reference axis.

9. The bib assembly of claim 6, wherein said bib body comprises a first zone located between said pair of sides, wherein none of said plurality of body reinforcement members extends into said first zone, and wherein said first zone is centrally disposed between said sides.

10. The bib assembly of claim 6, wherein each of said plurality of body reinforcement members is bendable into a predetermined shape, and wherein each of said plurality of body reinforcement members at least substantially retains said predetermined shape.

11. The bib assembly of claim 6, wherein said bib body comprises first and second sheets, and wherein each of said plurality of body reinforcement members is encased between said first and second sheets.

12. The bib assembly of claim 1, wherein said bib body comprises first and second connector pairs, wherein said first connector pair closes one end of said pocket, wherein said second connector pair closes an opposite end of said pocket, and wherein each of said first and second connector pairs comprise first and second connectors that are detachably engageable.

13. The bib assembly of claim 12, wherein said first connector pair is located at one of said sides, and wherein said second connector pair is located at the other of said sides.

14. The bib assembly of claim 1, wherein a lowermost portion of said pocket comprises a pocket bottom reinforcement member that extends between said sides of said pair of sides.

15. The bib assembly of claim 1, wherein a bend in each of said plurality of pocket reinforcement members defines a bottom of said pocket.

16. The bib assembly of claim 1, wherein each of said plurality of pocket reinforcement members is bendable into a predetermined shape, and wherein each of said plurality of pocket reinforcement members at least substantially retains said predetermined shape.

17. The bib assembly of claim 1, wherein said bib body comprises first and second sheets, and wherein each of said plurality of pocket reinforcement members is encased between said first and second sheets.

18. The bib assembly of claim 1, wherein said first section of said mounting clip comprises a flexible support, wherein said second snap connector is mounted to said support, and wherein said first clamping member is also mounted to said support.

19. A bib assembly, comprising:
a bib comprising:
a bib body comprising a top edge, a bottom edge, and a pair of sides, wherein a longitudinal reference axis extends between said top and bottom edges, wherein one side of said pair of sides is on one side of and is spaced from said longitudinal reference axis and the other side of said pair of sides is on an opposite side of and is spaced from said longitudinal reference axis, wherein said bib body comprises a first snap connector that is proximate to said top edge, wherein each said side comprises a side edge and a transition section, wherein each said transition section extends between a corresponding end of said top edge and its corresponding said side edge, and wherein each said transition section diverges away from said longitudinal reference axis proceeding from its corresponding said end of said top edge toward its corresponding said side edge; and
an elongated upper reinforcement member incorporated by said bib body, disposed within 1.25" of said top edge of said bib body, and having a length dimension that extends in a lateral dimension; and
a mounting clip comprising:
a first section comprising a second snap connector and a first clamping member that are spaced from one another; and
a second clamping member that is movably interconnected with said first clamping member;
wherein said second snap connector of said mounting clip is detachably connectable with said first snap connector of said bib body;
wherein said first and second clamping members are collectively rotatable relative to said bib body when said second snap connector of said mounting clip is detachably connected with said first snap connector of said bib body;
wherein said second clamping member is movable relative to said first clamping member to define open and closed positions for said mounting clip;
wherein said mounting clip is the only structure of said bib assembly that is included to suspend said bib from an article; and
wherein said bib is suspended from only a single location of the article when said mounting clip is in said closed position and with said first and second clamping members detachably engaging the article, and wherein said bib is suspended from only a single location at said first snap connector.

20. A bib assembly, comprising:
a bib comprising:
a bib body comprising a top edge, a bottom edge, and a pair of sides, wherein a longitudinal reference axis extends between said top and bottom edges, wherein one side of said pair of sides is on one side of and is spaced from said longitudinal reference axis and the other side of said pair of sides is on an opposite side of and is spaced from said longitudinal reference axis, and wherein said bib body comprises a first snap connector that is proximate to said top edge;

an elongated upper reinforcement member incorporated by said bib body, disposed within 1.25" of said top edge of said bib body, and having a length dimension that extends in a lateral dimension; and a plurality of flexible body reinforcement members incorporated by said bib body and that each extend inwardly toward said longitudinal reference axis; and a mounting clip comprising:
a first section comprising a second snap connector and a first clamping member that are spaced from one another; and
a second clamping member that is movably interconnected with said first clamping member;

wherein said second snap connector of said mounting clip is detachably connectable with said first snap connector of said bib body;

wherein said first and second clamping members are collectively rotatable relative to said bib body when said second snap connector of said mounting clip is detachably connected with said first snap connector of said bib body;

wherein said second clamping member is movable relative to said first clamping member to define open and closed positions for said mounting clip;

wherein said mounting clip is the only structure of said bib assembly that is included to suspend said bib from an article; and wherein said bib is suspended from only a single location of the article when said mounting clip is in said closed position and with said first and second clamping members detachably engaging the article, and wherein said bib is suspended from only a single location at said first snap connector.

21. A bib assembly, comprising:
a bib comprising:
a bib body comprising a top edge, a bottom edge, and a pair of sides, wherein a longitudinal reference axis extends between said top and bottom edges, wherein one side of said pair of sides is on one side of and is spaced from said longitudinal reference axis and the other side of said pair of sides is on an opposite side of and is spaced from said longitudinal reference axis, wherein said bib body comprises a first snap connector that is proximate to said top edge, wherein said bib body comprises a pocket, wherein said bib body comprises first and second connector pairs, wherein said first connector pair closes one end of said pocket, wherein said second connector pair closes an opposite end of said pocket, and wherein each of said first and second connector pairs comprise first and second connectors that are detachably engageable; and an elongated upper reinforcement member incorporated by said bib body, disposed within 1.25" of said top edge of said bib body, and having a length dimension that extends in a lateral dimension; and a mounting clip comprising:
a first section comprising a second snap connector and a first clamping member that are spaced from one another; and
a second clamping member that is movably interconnected with said first clamping member;

wherein said second snap connector of said mounting clip is detachably connectable with said first snap connector of said bib body;

wherein said first and second clamping members are collectively rotatable relative to said bib body when said second snap connector of said mounting clip is detachably connected with said first snap connector of said bib body;

wherein said second clamping member is movable relative to said first clamping member to define open and closed positions for said mounting clip;

wherein said mounting clip is the only structure of said bib assembly that is included to suspend said bib from an article; and wherein said bib is suspended from only a single location of the article when said mounting clip is in said closed position and with said first and second clamping members detachably engaging the article, and wherein said bib is suspended from only a single location at said first snap connector.

22. A bib assembly, comprising:
a bib comprising:
a bib body comprising a top edge, a bottom edge, and a pair of sides, wherein a longitudinal reference axis extends between said top and bottom edges, wherein one side of said pair of sides is on one side of and is spaced from said longitudinal reference axis and the other side of said pair of sides is on an opposite side of and is spaced from said longitudinal reference axis, wherein said bib body comprises a first snap connector that is proximate to said top edge, wherein said bib body comprises a pocket, and wherein a lowermost portion of said pocket comprises a pocket bottom reinforcement member that extends between said pair of sides; and an elongated upper reinforcement member incorporated by said bib body, disposed within 1.25" of said top edge of said bib body, and having a length dimension that extends in a lateral dimension; and a mounting clip comprising:
a first section comprising a second snap connector and a first clamping member that are spaced from one another; and
a second clamping member that is movably interconnected with said first clamping member;

wherein said second snap connector of said mounting clip is detachably connectable with said first snap connector of said bib body;

wherein said first and second clamping members are collectively rotatable relative to said bib body when said second snap connector of said mounting clip is detachably connected with said first snap connector of said bib body;

wherein said second clamping member is movable relative to said first clamping member to define open and closed positions for said mounting clip;

wherein said mounting clip is the only structure of said bib assembly that is included to suspend said bib from an article; and wherein said bib is suspended from only a single location of the article when said mounting clip is in said closed position and with said first and second clamping members detachably engaging the article, and wherein said bib is suspended from only a single location at said first snap connector.

\* \* \* \* \*